US012237567B2

(12) United States Patent
Jung et al.

(10) Patent No.: US 12,237,567 B2
(45) Date of Patent: Feb. 25, 2025

(54) ELECTRONIC DEVICE COMPRISING ANTENNA

(71) Applicant: SAMSUNG ELECTRONICS CO., LTD., Suwon-si (KR)

(72) Inventors: Hojin Jung, Suwon-si (KR); Hyunsuk Kim, Suwon-si (KR); Kyungmoon Seol, Suwon-si (KR); Seongyong An, Suwon-si (KR); Hyoungtak Cho, Suwon-si (KR); Youngmin Ji, Suwon-si (KR); Jaebong Chun, Suwon-si (KR); Hochul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 18/067,119

(22) Filed: Dec. 16, 2022

(65) Prior Publication Data

US 2023/0120718 A1 Apr. 20, 2023

Related U.S. Application Data

(63) Continuation of application No. PCT/KR2022/004311, filed on Mar. 28, 2022.

(30) Foreign Application Priority Data

Mar. 30, 2021 (KR) ........................ 10-2021-0041144

(51) Int. Cl.
*H01Q 1/24* (2006.01)
*H01Q 3/12* (2006.01)
*H01Q 5/314* (2015.01)

(52) U.S. Cl.
CPC ............... *H01Q 1/243* (2013.01); *H01Q 3/12* (2013.01); *H01Q 5/314* (2015.01)

(58) Field of Classification Search
CPC ........... H01Q 1/243; H01Q 5/314; H01Q 3/12
See application file for complete search history.

(56) References Cited

U.S. PATENT DOCUMENTS 8,711,566 B2 4/2014 O'Brien
10,079,425 B2 9/2018 Chun et al.
(Continued)

FOREIGN PATENT DOCUMENTS

JP 6602326 11/2019
KR 10-2014-0105886 9/2014
(Continued)

OTHER PUBLICATIONS

International Search Report for PCT/KR2022/004311, mailed Jul. 13, 2022, 6 pages.
(Continued)

*Primary Examiner* — Henry Luong
(74) *Attorney, Agent, or Firm* — Nixon & Vanderhye, P.C.

(57) ABSTRACT

According to various embodiments of the disclosure, an electronic device may include: a first housing, a second housing, a printed circuit board (PCB), and a wireless communication circuit, wherein the first housing may include a first surface and a second surface perpendicular to the first surface at a first edge, and a first conductive area, and the first conductive area may include a first portion of a first slit extending from a point on the first surface to the first edge, a third surface of the second housing may include a second conductive area, and the second conductive area may include a second slit, wherein, in a first state, at least a portion of the first portion of the first slit may overlap the second slit when viewed in a second direction perpendicular to the first surface of the first housing, and wherein the wireless communication circuit may be configured to trans-
(Continued)

mit and/or receive a signal of a first frequency band based on an electrical path including the first portion.

20 Claims, 24 Drawing Sheets

(56) References Cited

U.S. PATENT DOCUMENTS

| | | | |
|---|---|---|---|
| 10,629,982 | B2 | 4/2020 | Kim et al. |
| 10,931,323 | B2 | 2/2021 | Lee et al. |
| 11,470,729 | B2 | 10/2022 | Kim et al. |
| 2018/0226722 | A1 | 8/2018 | Yamada et al. |
| 2019/0007533 | A1 | 1/2019 | Kim et al. |
| 2019/0140342 | A1 | 5/2019 | Lim et al. |
| 2022/0131276 | A1 | 4/2022 | Kim et al. |
| 2022/0159826 | A1 | 5/2022 | Yun et al. |
| 2023/0043326 | A1 | 2/2023 | Kim et al. |

FOREIGN PATENT DOCUMENTS

| | | | |
|---|---|---|---|
| KR | 10-2017-0133952 | 12/2017 | |
| KR | 10-1968632 | 4/2019 | |
| KR | 10-2019-0077107 | 7/2019 | |
| KR | 10-2019-0143029 | 12/2019 | |
| KR | 10-2020-0112224 | 10/2020 | |
| KR | 10-2020-0117741 | 10/2020 | |
| KR | 10-2020-0121518 | 10/2020 | |
| KR | 10-2164704 | 10/2020 | |
| KR | 10-2021-0004752 | 1/2021 | |
| WO | 2019/245165 | 12/2019 | |
| WO | WO-2019245165 A1 * | 12/2019 | ........... G06F 1/1624 |

OTHER PUBLICATIONS

Written Opinion of the ISA for PCT/KR2022/004311, mailed Jul. 13, 2022, 3 pages.

Extended European Search Report dated Apr. 23, 2024 issued in European Patent Application No. 22781527.1.

* cited by examiner

ELECTRONIC DEVICE COMPRISING ANTENNA

CROSS-REFERENCE TO RELATED APPLICATIONS

This application is a continuation of International Application No. PCT/KR2022/004311 designating the United States, filed on Mar. 28, 2022, in the Korean Intellectual Property Receiving Office and claiming priority to Korean Patent Application No. 10-2021-0041144, filed on Mar. 30, 2021, in the Korean Intellectual Property Office, the disclosures of which are incorporated by reference herein in their entireties.

BACKGROUND

Field

Embodiments of the disclosure relate to an electronic device including an antenna.

Description of Related Art

An electronic device may include a display having a larger area to provide a wide screen. However, since the size of the electronic device also increases as the size of the display increases, there may be a limit to the size of the display. In order to overcome this limitation, a rollable electronic device as a next-generation display device may include a flexible display. The flexible display may be selectively slid into the housing, whereby the flexible display may have a large area for providing a large screen while maintaining the size of the electronic device.

An electronic device having a communication function may include a plurality of antennas in order to provide mobile communication services of different frequency bands using a single electronic device while being reduced in size and weight. For example, a multi-input multi-output (MIMO) technique is defined in IEEE 802.11n, IEEE 802.11ac, and IEEE 802.11ax standards, and MIMO antennas related to 2G, 3G, 4G, and 5G may be included in an electronic device.

A rollable electronic device may include a first housing and a second housing slidably connected to the first housing. In a first state, the second housing may overlap the first housing, and at least a portion of the second housing may be slid into 5 the first housing. The first housing may include a first conductive area, and at least a portion of the first conductive area may operate as a radiator of an antenna. The second housing may include a second conductive area. The antenna may have to secure a separation distance greater than or equal to a specific distance from the second conductive area in order to secure the performance thereof. However, in the first state, as the second housing is slid into the first housing, the antenna including at least a portion of the first conductive area may be located adjacent to the second conductive area. Accordingly, in the first state, it may be difficult for the antenna to secure the separation distance greater than or equal to the specific distance from the second conductive area, and the radiation performance of the antenna may be degraded.

SUMMARY

Embodiments of the disclosure provide an electronic device having a second housing that may include a slit structure provided in a second conductive area thereof and in a first state, the slit structure may overlap an antenna provided in a first conductive area of a first housing when viewed in a specific direction, making it possible to secure a separation distance between the antenna and the second conductive area in the first state.

An electronic device according to various example embodiments of the disclosure may include: a first housing, a second housing slidably connected to the first housing, a printed circuit board (PCB) disposed in the electronic device, and a wireless communication circuit disposed on the PCB, wherein the first housing may include a first surface and a second surface perpendicular to the first surface at a first edge, and the first housing may include a first conductive area, the first conductive area may include a first portion of a first slit extending from a point on the first surface to the first edge, wherein the second housing may include a third surface including a second conductive area, and the second conductive area may include a second slit extending to an edge of the second housing corresponding to the first edge of the first housing, wherein, in a first state in which the second housing is slid in a first direction to be adjacent to the first housing, at least a portion of the first portion of the first slit may overlap the second slit when viewed in a second direction perpendicular to the first surface of the first housing, and the wireless communication circuit may be configured to transmit and/or receive a signal of a first frequency band based on an electrical path including the first portion of the first slit.

An electronic device according to various example embodiments of the disclosure may include: a first metal housing, a second metal housing slidably connected to the first metal housing, and a wireless communication circuit disposed in the electronic device, wherein the first metal housing may include a first surface and a second surface perpendicular to the first surface at a first edge, and the first surface may include a first slit extending to the first edge from a point on the first surface, wherein the second metal housing may include a third surface including a second slit extending to an edge of the second metal housing corresponding to the first edge of the first metal housing, wherein in a first state in which the second metal housing is slid in a direction approaching the first metal housing, at least a portion of the first slit may overlap the second slit when viewed in a first direction perpendicular to the first surface of the first metal housing, and the wireless communication circuit may be configured to transmit and/or receive a signal of a first frequency band based on an electrical path including the first slit structure.

According to various example embodiments disclosed herein, since the separation distance between an antenna and a conductive area is secured in an electronic device, it is possible to reduce degradation of the radiation performance of the antenna.

In addition, various effects directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described with reference to the accompanying drawings. However, it shall be understood that it is not intended to limit the disclosure to specific embodiments, and that the disclosure includes various modifications, equivalents, or alternatives of the embodiments of the disclosure.

Figure 1:
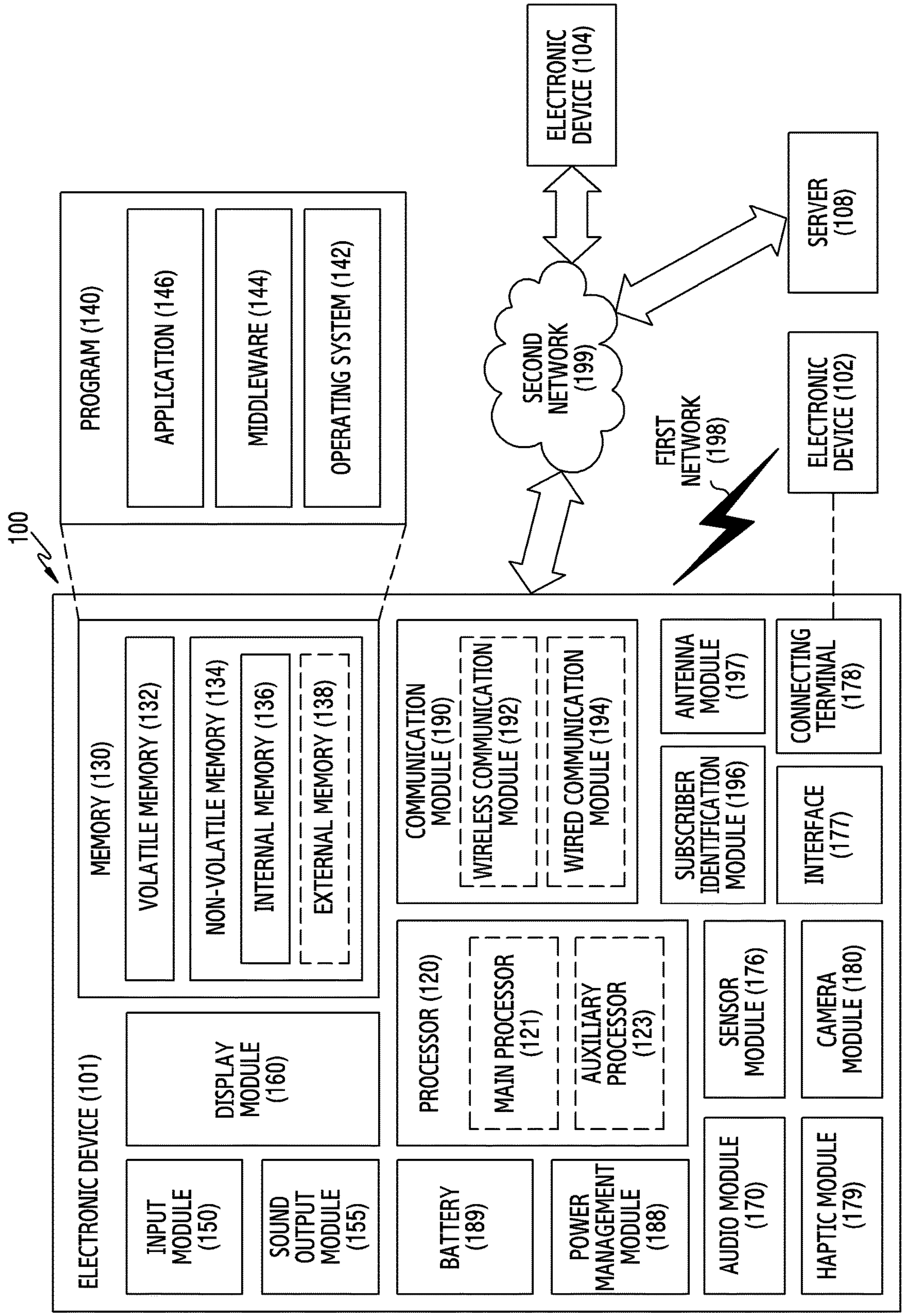
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor

121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
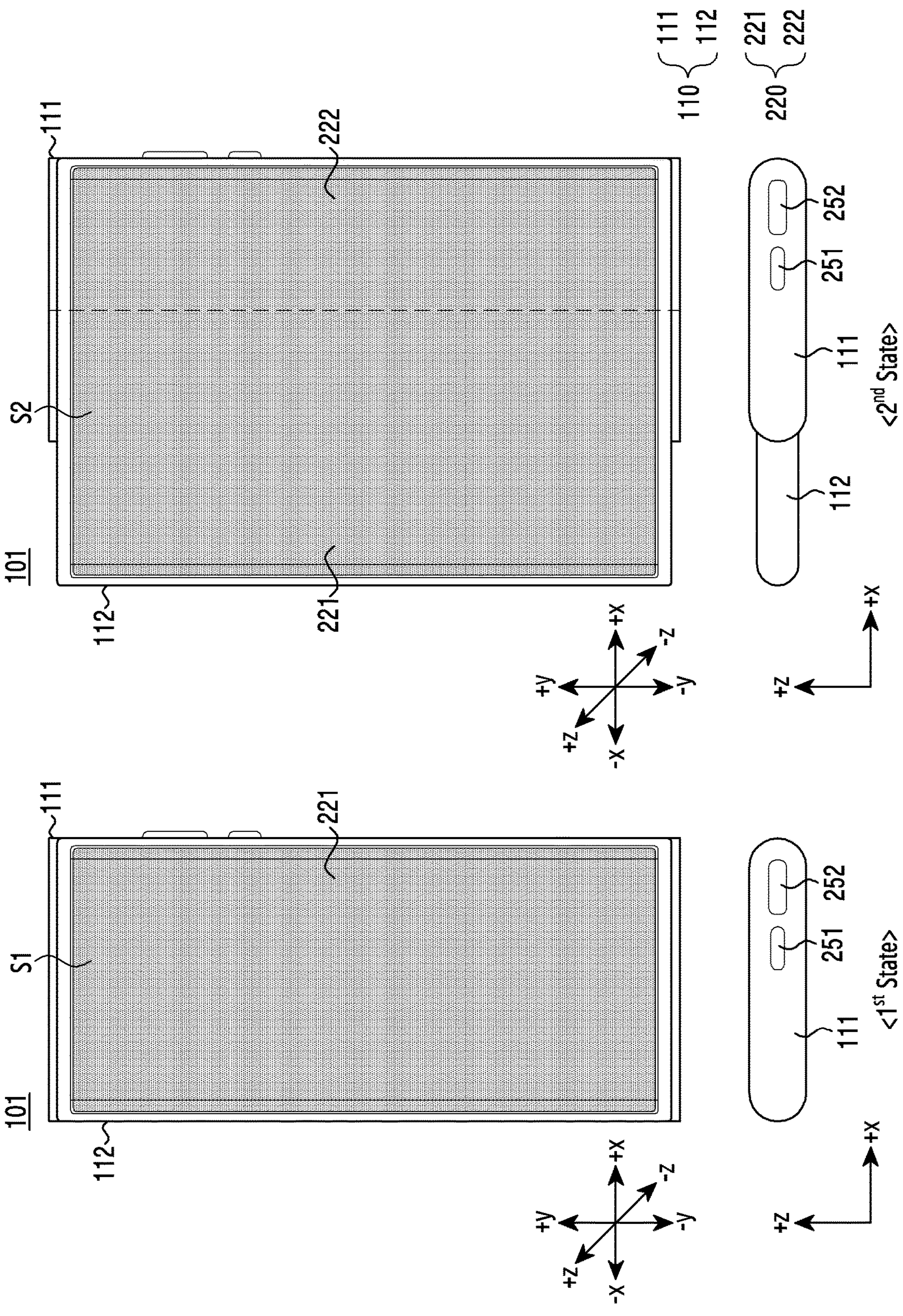
FIG. 2A is a diagram illustrating the front side of an electronic device when the electronic device is in a first state or a second state according to various embodiments.

FIG. 2A is a diagram illustrating the front side of an electronic device when the electronic device is in a first state or a second state according to various embodiments.

Figure 2B:
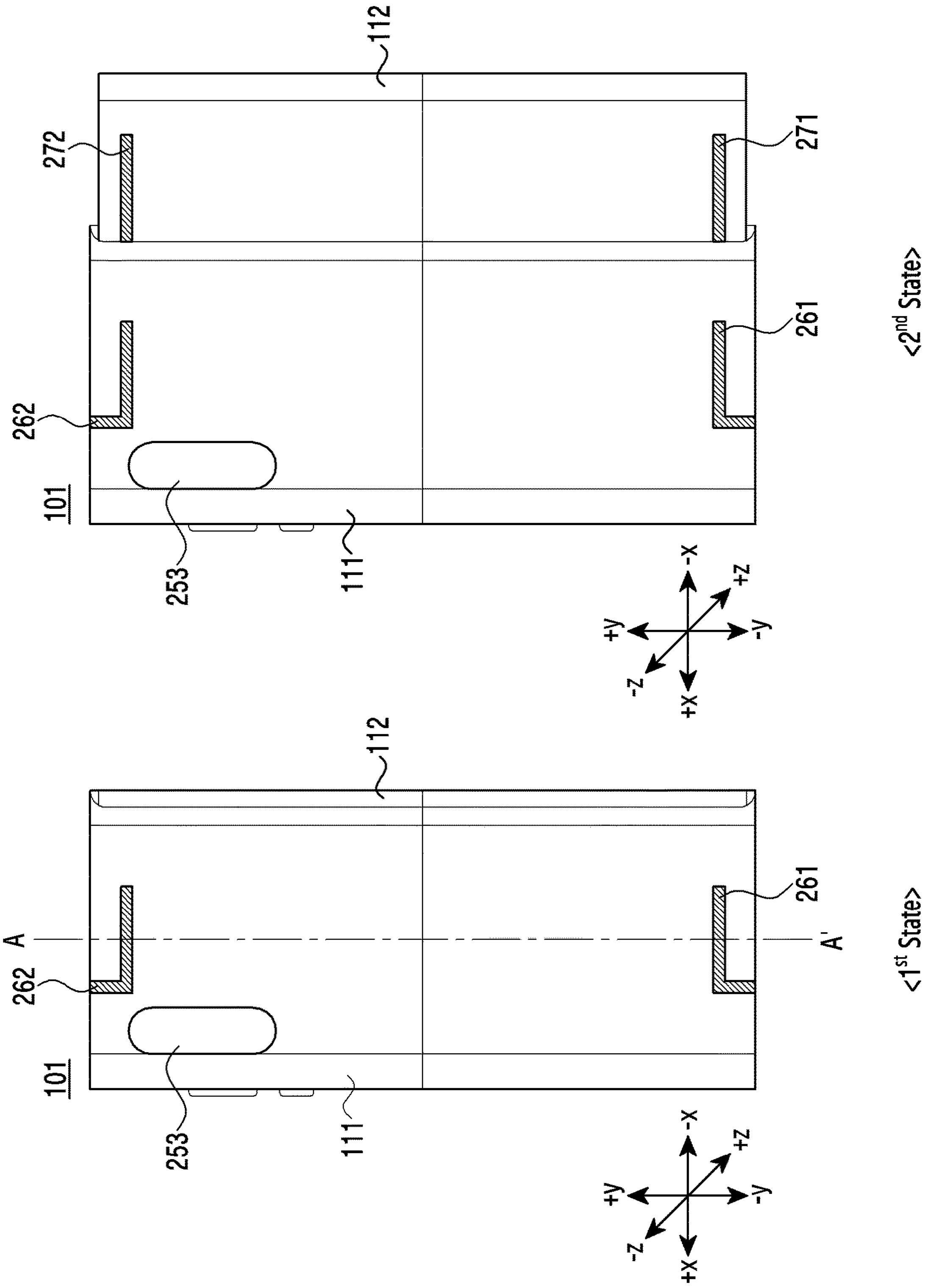
FIG. 2B is a diagram illustrating the rear side of the electronic device when the electronic device is in the first state or the second state according to various embodiments.

FIG. 2B is a diagram illustrating the rear side of the electronic device when the electronic device is in the first state or the second state according to various embodiments.

Referring to FIGS. 2A and 2B, the electronic device 101 according to an embodiment may include a housing 110 that forms an exterior.

According to an embodiment, the housing 110 may form a partial area of the front surface, a partial area of the rear surface, and/or a side surface of the electronic device 101. According to an embodiment, the housing 110 may form a partial area of the side surface and/or the rear surface of the electronic device 101. In an embodiment, the housing 110 may include a conductive material (e.g., metal).

According to an embodiment, the housing 110 may include a first housing 110 and a second housing 112 connected to the first housing 111 to be slidable (e.g., slide-in or slide-out) relative to the first housing 111 and the first housing 111 in a specific range.

According to an embodiment, the first housing 111 may include a speaker hole 251, a connector hole 252, and/or a camera hole 253. In an embodiment, a sound output module 155 (refer to FIG. 1) disposed in the electronic device 101 may output sound to the outside of the electronic device 101 through the speaker hole 251. In an embodiment, the connector hole 252 may accommodate, for example, a connector (e.g., a USB connector) for transmitting and/or receiving power and/or data to and/or from an external electronic device. In an embodiment, the camera hole 253 may correspond to a hole through which at least one lens of the camera module 180 is exposed. Light outside the electronic device 101 may be incident to the camera module 180 disposed inside the electronic device 101 through the camera hole 253.

According to an embodiment, the first housing 111 may include a first slit structure 261 and a first additional slit structure 262 on the rear surface. In an embodiment, as will be described with reference to FIG. 6, the electronic device 101 may transmit and/or receive a radio frequency (RF) signal of a specific frequency band using the first slit structure 261 and the first additional slit structure 262. In an embodiment, the second housing 112 may include a second slit structure 271 and/or a second additional slit structure 272 on the rear surface. In an embodiment, as will be described later with reference to FIG. 6, in the electronic device 101, the first slit structure 261 and the first additional slit structure 262 of the first housing 111 may be spaced apart from a conductive area provided in the second housing 112 by a specific distance or more in a specific direction (e.g., the −z direction) using the second slit structure 271 and the second additional slit structure 272, respectively.

According to an embodiment, the electronic device 101 may have a first state and/or a second state. In an embodiment, the electronic device 101 may have a first state, a second state, and/or an intermediate state between the first state and the second state.

In an embodiment, the first state and/or the second state of the electronic device 101 may be determined depending on a relative position of the second housing 112 with respect to the first housing 111. For example, the state in which the second housing 112 is slid in a direction approaching the first housing 111 (e.g., the +x direction) and the first housing 111 and the second housing 112 are adjacent to or in contact with each other may be referred to as the first state. As another example, the state in which the second housing 112 is slid in a direction away from the first housing 111 (e.g., the −x direction) may be referred to as the second state. In an embodiment, the first state and the second state of the electronic device 101 may be determined depending on the size of the flexible display 220 exposed to the outside. For example, only a first portion 221 of the flexible display 220 may be exposed (e.g., visible—as used herein when referring to the amount of a flexible display visible to the outside, the terms "exposed" and "visible" may be used interchangeably) to the outside of the electronic device 101, and the state in which the flexible display 220 exposed to the outside has the first size S1 may be the first state. As another example, the first portion 221 and the second portion of the flexible display 220 may be exposed to the outside of the electronic device 101, and the state in which the exposed flexible display 220 exposed to the outside has a second size S2 may be the second state. As another example, the state in which the size of the flexible display 220 exposed to the outside has a third size between the first size S1 and the second size S2 may be an intermediate state.

In an embodiment, the electronic device 101 may be switched between the first state and the second state through a user's manipulation or a mechanical operation. According to an embodiment, the housing 110 may include a button in a portion, and the electronic device 101 may be switched between the first state and the second state through the user's manipulation (e.g., an input of pushing or touching the button).

According to an embodiment, the flexible display 220 may occupy most of the front surface of the electronic device 101. For example, the front surface of the electronic device 101 may include a flexible display 220 and a bezel region partially surrounding the periphery of the flexible display 220. According to an embodiment, the flexible display 220 may be disposed to include at least a portion of a flat shape or at least a portion of a curved shape.

According to an embodiment, the flexible display 220 may include a first portion 221 and/or a second portion 222 extending from the first portion 221. In an embodiment, the second portion 222 of the flexible display 220 may be slid into the housing 110 or slid out of the housing 110 depending on the state of the electronic device 101. For example, when the electronic device 101 is in the first state, the second portion 222 of the flexible display 220 may be slid into and disposed in the housing 110 and may not be viewed from the outside. As another example, when the electronic device 101 is in the second state, the second portion 222 of the flexible display 220 may be slid and disposed out of the housing 110, and may be viewed from the outside.

The shape of the electronic device 101 illustrated in FIGS. 2A and 2B is provided for describing an example of the electronic device 101 capable of expanding the display area, and the shape of the electronic device 101 is not limited that illustrated in FIGS. 2A and 2B.

Figure 3:
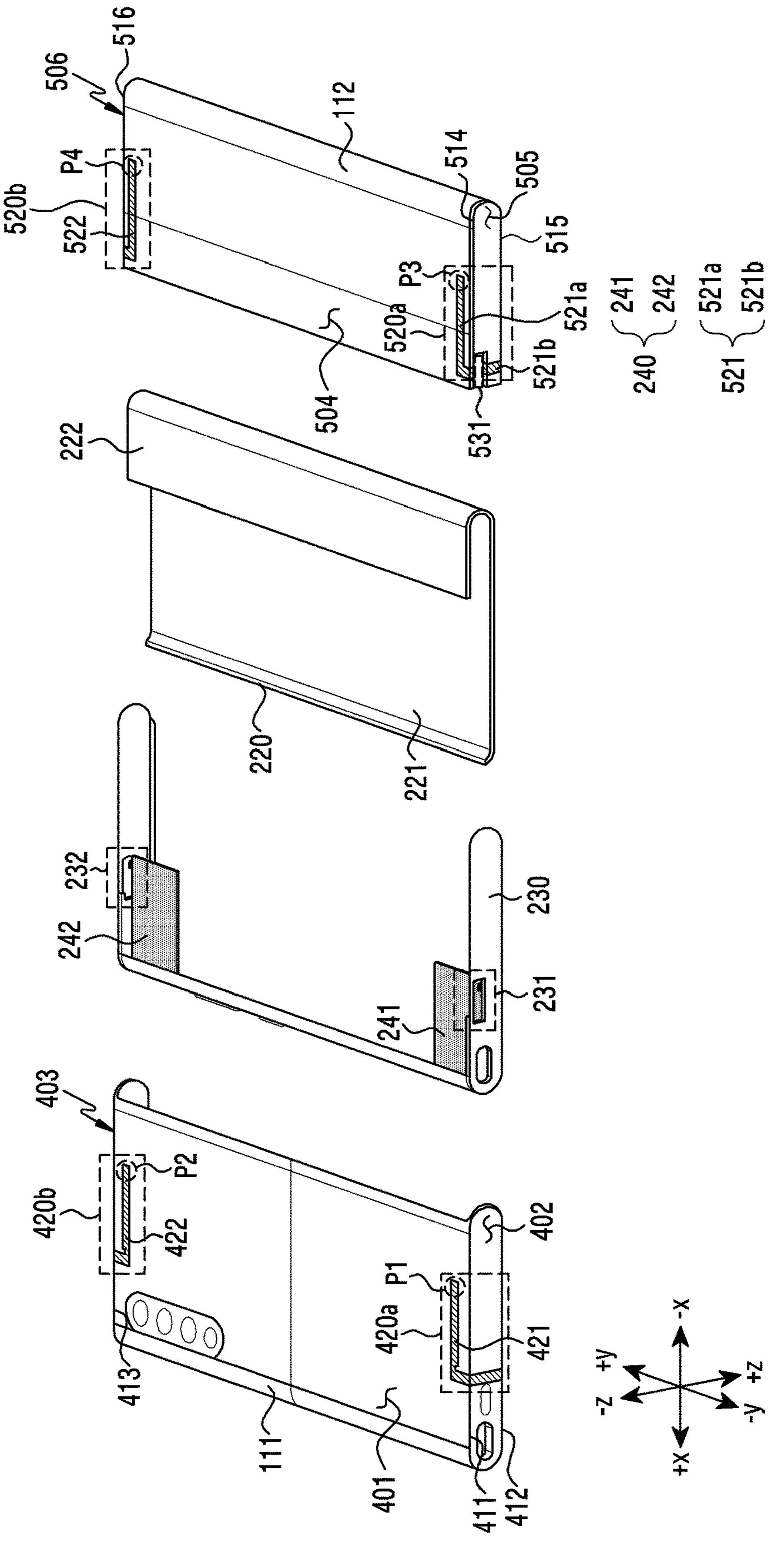
FIG. 3 is an exploded perspective view of an electronic device according to various embodiments.

FIG. 3 is an exploded perspective view of an electronic device according to various embodiments.

Referring to FIG. 3, the electronic device 101 according to an embodiment may include a first housing 111, a second housing 112, a flexible display 220, a printed circuit board (PCB) 240, and/or a support member (e.g., support) 230.

According to an embodiment, the first housing 111 may include a first surface 401 that provides at least a portion of the rear surface of the electronic device 101 and a second surface 402 that is perpendicular to the first surface 401 at a first edge 411. In an embodiment, the first housing 111 may include a first slit structure 421 provided on the first surface 401 and the second surface 402. In an embodiment, the first slit structure 421 may extend from a first point P1 of the first surface 401 to the first edge 411. In addition, the first slit structure 421 may further extend from the first edge 411 to the second edge 412 along the second surface 402 in a first direction (e.g., the +z direction). In an embodiment, the first slit structure 421 may be provided in a first conductive area

420*a* of the first housing 111. In FIG. 3, the first conductive area 420*a* of the first housing 111 is indicated as a partial area of the first housing 111. However, this is for convenience of description, and the range of the first conductive area 420*a* is limited thereto. In an embodiment, the first slit structure 421 may be substantially the same as or similar to the first slit structure 261 of FIG. 2B.

According to an embodiment, the first housing 111 may include a third surface 403 perpendicular to the first surface 401 at a third edge 413. In an embodiment, the first housing 111 may include a first additional slit structure 422 provided on the first surface 401 and the third surface 403. In an embodiment, the first additional slit structure 422 may extend from a second point P2 of the first surface 401 to the third edge 413. In addition, although not illustrated in FIG. 3, the first additional slit structure 422 may further extend from the third edge 413 in the first direction (e.g., the +z direction). In an embodiment, the first additional slit structure 422 may be provided in a first additional conductive area 420*b* of the first housing 111. In FIG. 3, the first additional conductive area 420*b* of the first housing 111 is indicated as a partial area of the first housing 111. However, this is for convenience of description, and the range of the first additional conductive area 420*b* is limited thereto. In an embodiment, the first additional slit structure 422 may be substantially the same as or similar to the first additional slit structure 262 of FIG. 2B.

According to an embodiment, the first slit structure 421 may have various shapes (e.g., an L shape, a V shape, or an inverted L shape) and various lengths depending on a frequency band in which a slit antenna including the first slit structure 421 is desired to operate. As another example, the first additional slit structure 422 may have various shapes (e.g., an L shape, a V shape, or an inverted L shape) and various lengths depending on a frequency band in which a slit antenna including the first additional slit structure 422 is desired to operate. According to an embodiment, the first slit structure 421 may have an open slit structure in which one end extends to the second edge 412. As another example, the first additional slit structure 422 may have an open slit structure.

According to an embodiment, the first slit structure 421 and/or the first additional slit structure 422 may have a closed slit structure. In an embodiment, the first housing 111 may include an additional slit structure provided in the conductive area of the first housing 111 in addition to the first slit structure 421 and the second slit structure 521. According to an embodiment, the first housing 111 may include only the first slit structure 421 or only the first additional slit structure 422.

According to an embodiment, the PCB 240 may include a first PCB 241 and/or a second PCB 242. According to an embodiment, a plurality of electronic components may be disposed on the PCB 240. For example, a processor 120, a wireless communication circuit, a memory 130, a control circuit, and/or an interface 177 (refer to FIG. 1) may be disposed on the PCB 240. In an embodiment, the PCB 240 may be formed of a material (e.g., FR4) having a non-bendable property. According to an embodiment, the PCB 240 may be a flexible printed circuit board (FPCB) having a bendable property (or "flexible property"). In an embodiment, the first PCB 241 and the second PCB 242 may be configured integrally. In an embodiment, the first PCB 241 and the second PCB 242 may be electrically connected to each other.

According to an embodiment, the support member 230 may include a first opening 231 and/or a second opening 232. A conductive connection member, which will be described in greater detail below with reference to FIG. 11, may be electrically connected to the first slit structure 421 provided in the first conductive area 420*a* of the first housing 111 through the first opening 231 and/or the second opening 232. In an embodiment, at least a portion of the flexible display 220 may be fixedly seated on the support member 230. In an embodiment, the support member 230 may include an insulating material (e.g., plastic or resin).

According to an embodiment, the second housing 112 may include a fourth surface 504 that provides at least a portion of the rear surface of the electronic device 101 and a fifth surface 505 that is perpendicular to the fourth surface 504 at a fourth edge 514. In an embodiment, the second housing 112 may include a second slit structure 521 provided on the fourth surface 504 and the fifth surface 505. In an embodiment, the second slit structure 521 may include a first portion 521*a* and a second portion 521*b*. A portion of the first portion 521*a* of the second slit structure 521 extends from a third point P3 of the fourth surface 504 to the fourth edge 514, and another portion may be provided on the fifth surface 505 in the first direction (e.g., the +z direction). The second portion 521*b* of the second slit structure 521 may be a portion that is provided on a portion of the fifth surface 505 in the second direction (e.g., the −z direction) from the fifth edge 515 of the second housing 112. In an embodiment, the second slit structure 521 may be provided in a second conductive area 520*a* of the second housing 112. In FIG. 3, the second conductive area 520*a* of the second housing 112 is indicated as a partial area of the second housing 112. However, this is for convenience of description, and the range of the second conductive area 520*a* is limited thereto. In an embodiment, the second slit structure 521 may be substantially the same as the second slit structure 271 of FIG. 2B. According to an embodiment, the second housing 112 may include only the first portion 521*a* of the second slit structure 521 without including the second portion 521*b* of the second slit structure 521.

According to an embodiment, the second housing 112 may include a sixth surface 506 perpendicular to the fourth surface 504 at a sixth edge 516. In an embodiment, the second housing 112 may include a second additional slit structure 522 provided on the fourth surface 504 and the sixth surface 506. A portion of the second additional slit structure 522 may extend on the fourth surface 504 from the fourth point P4 to the sixth edge 516 of the second housing 112, and another portion may be provided on the sixth surface 506 in the first direction (e.g., the +z direction). In FIG. 3, the portion of the second additional slit structure 522 provided along the sixth surface 506 is not illustrated since the sixth surface 506 is not illustrated, but in practice, the second housing 112 may include the portion of the second additional slit structure 522 provided on the sixth surface 506. In an embodiment, the second additional slit structure 522 may be provided in a second additional conductive area 520*b* of the second housing 112. In FIG. 3, the second additional conductive area 520*b* of the second housing 112 is indicated as a partial area of the second housing 112. However, this is for convenience of description, and the range of the second additional conductive area 520*b* is limited thereto. In an embodiment, the second additional slit structure 522 may be substantially the same as the second additional slit structure 272 of FIG. 2B.

According to an embodiment, the second slit structure 521 may have a shape corresponding to the shape of the first slit structure 421 of the first housing 111. For example, when the first slit structure 421 has an L shape, the second slit structure 521 may have an L shape corresponding to the first slit structure 421. In an embodiment, the second additional slit structure 522 may have a shape corresponding to the shape of the first additional slit structure 422 of the first housing 111. For example, when the first additional slit structure 422 has a V shape, the second additional slit structure 522 may have a V shape to correspond to the first additional slit structure 422.

According to an embodiment, the second housing 112 may include only the second slit structure 521 or only the second additional slit structure 522.

According to an embodiment, the second housing 112 may include a first groove 531 extending from one edge portion of the fifth surface 505 in the second direction (e.g., −x direction). Although not illustrated in FIG. 3, the second housing 112 may include a second groove extending from one edge portion of the sixth surface 506 in the second direction (e.g., the −x direction).

Figure 4:
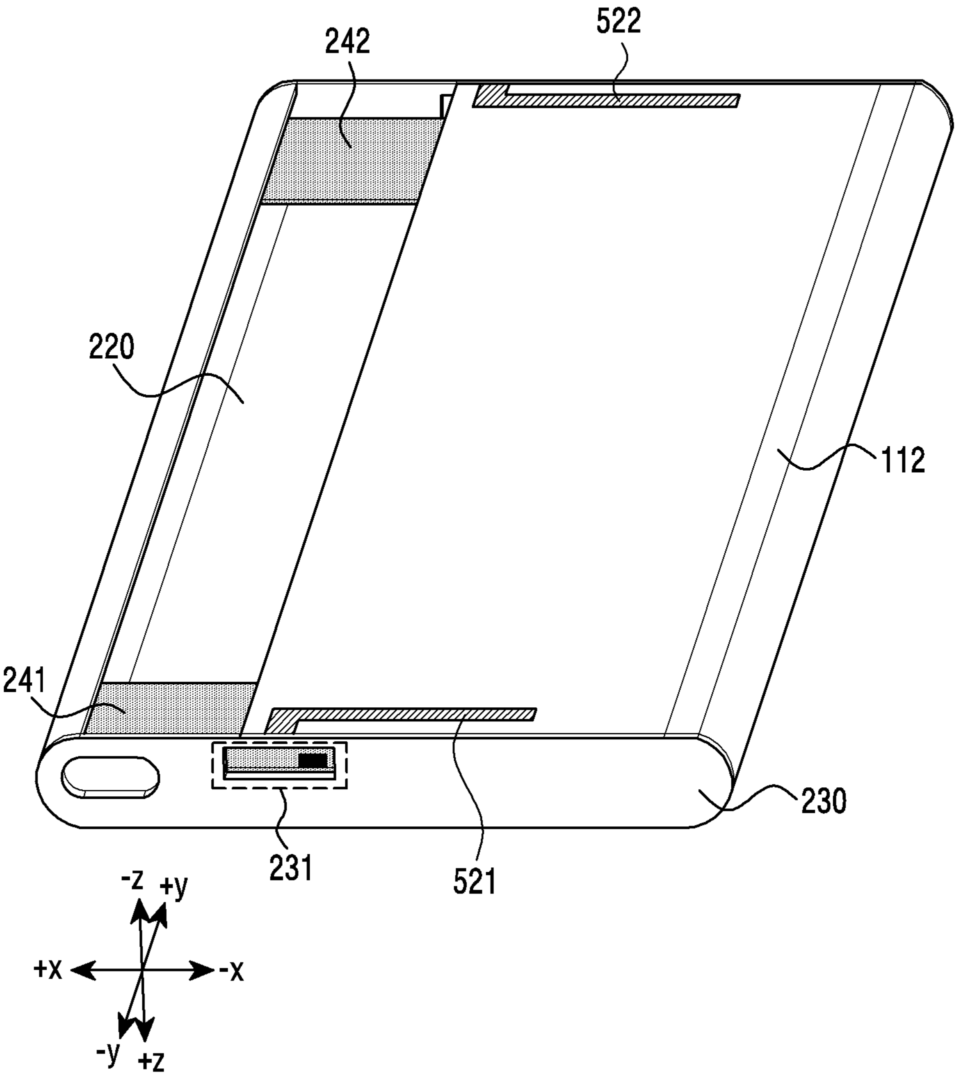
FIG. 4 is a perspective view illustrating an internal structure in which a support member, a flexible display, and a second housing are coupled when the electronic device is in the first state according to various embodiments.

FIG. 4 is a perspective view illustrating an internal structure in which a support member, a flexible display, and a second housing are coupled when the electronic device is in the first state according to various embodiments.

Referring to FIG. 4, when the electronic device 101 according to an embodiment is in the first state, at least a portion of the second housing 112 may be slid into the support member 230. In FIG. 4, the first housing 111 is omitted in order to describe the internal structure, but, in the first state, in practice, the support member 230 may be disposed inside the first housing 111, and the second housing 112 may be slid into the support member 230. Accordingly, the support member 230 may be disposed between the first housing 111 and the second housing 112. In an embodiment, the support member 230 may include an insulating material, and may be disposed between the first housing 111 and the second housing 112 to prevent or reduce coupling between a conductive portion (e.g., the first conductive area 420*a* in FIG. 3) of the first housing 111 and the conductive portion (e.g., the second conductive area 520*a* in FIG. 3) of the second housing 112.

In an embodiment, in the first state, when viewed in the −y-axis direction, the first opening 231 formed in the first support member 230 may overlap at least a portion of the first groove 531 formed in the second housing 112.

Figure 5:
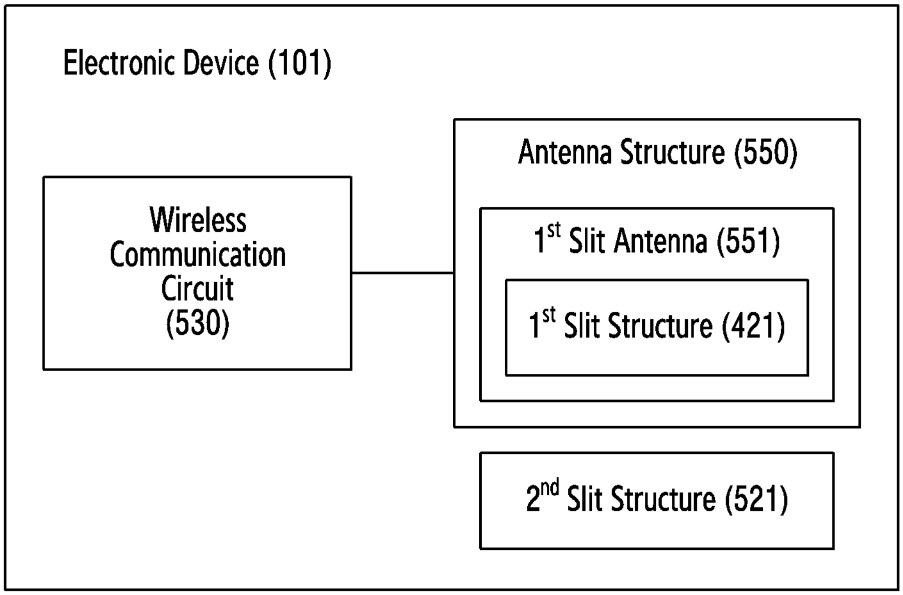
FIG. 5 is a block diagram illustrating an example operation of a slit antenna according to a state of an electronic device according to various embodiments.

FIG. 5 is a block diagram for describing an example operation of a slit antenna according to a state of an electronic device according to various embodiments.

Referring to FIG. 5, an electronic device 101 according to an embodiment may include a wireless communication circuit 530 and an antenna structure 550.

According to an embodiment, when the electronic device 101 is in the first state, the wireless communication circuit 530 may transmit and/or receive an RF signal of a first frequency band by feeding power to a point of the first slit structure 421. Hereinafter, an antenna including the first slit structure 421 may be referred to as a first slit antenna 551. In an embodiment, when the electronic device 101 is in the first state, as will be described in greater detail below with reference to FIG. 6, at least a portion of the second slit structure 521 may be disposed to overlap the first slit structure 421 when viewed in a specific direction. In an embodiment, when the electronic device 101 is in the first state, as will be described in greater detail below with reference to FIG. 16 and/or FIG. 18, the frequency band in which the first slit antenna 551 operates may vary depending on the length and/or width of the second slit structure 521.

According to an embodiment, when the electronic device 101 is in the second state, the wireless communication circuit 530 may transmit and/or receive an RF signal of the first frequency band by feeding power to a point of the first slit structure 421.

In an embodiment, the antenna structure 550 may additionally include various types of antenna structures. For example, the antenna structure 550 may include, without limitation, a patch antenna, a dipole antenna, a monopole antenna, a slit antenna, a loop antenna, an inverted-F antenna, a planar inverted-F antenna, and/or an antenna structure in which two or more of these antennas are combined, in addition to the first slit antenna 551.

Figure 6:
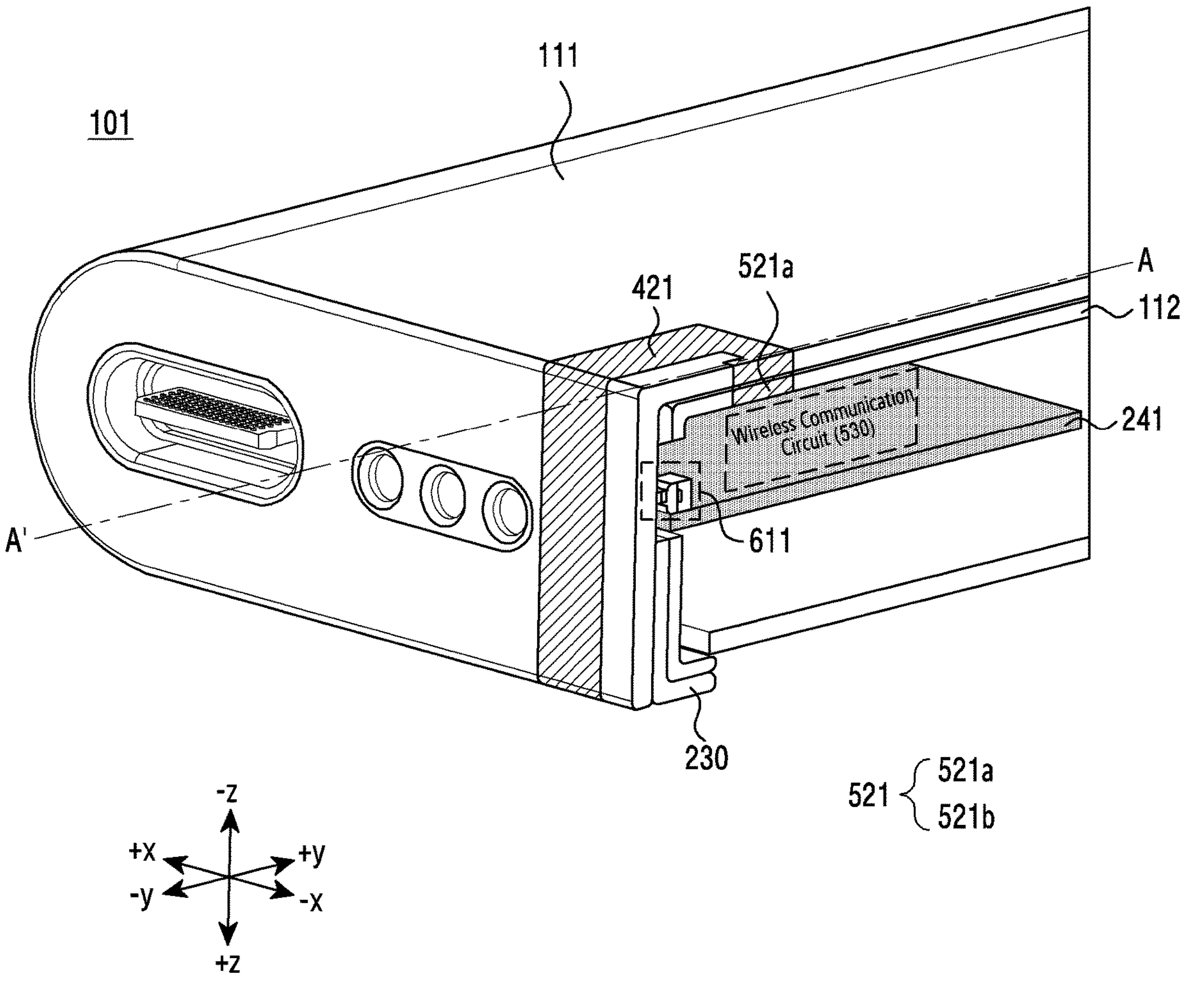
FIG. 6 is a partial sectional perspective view illustrating a cross section A-A' of the electronic device of FIG. 2B, according to various embodiments.

FIG. 6 is a partial sectional perspective view illustrating a cross section A-A' of the electronic device of FIG. 2B, according to various embodiments.

Referring to FIG. 6, when the electronic device 101 according to an embodiment is in the first state, at least a portion of the second housing 112 may be slid into the first housing 111. In an embodiment, since the second housing 112 is slid into the first housing 111 when the electronic device 101 is in the first state, at least a portion of the second slit structure 521 of the second housing 112 may overlap the first slit structure 421 of the first housing 111 when viewed in a specific direction. For example, in the first state, at least a portion of the first portion 521*a* of the second slit structure 521 may overlap the first slit structure 421 when viewed in the first direction (e.g., the +z direction). As another example, although covered by the first housing 111 in FIG. 6, at least a portion of the second portion 521*b* of the second slit structure 521 may overlap the first slit structure 421 when viewed in the second direction (e.g., the +y direction).

According to an embodiment, a wireless communication circuit 530 may be disposed on the first PCB 241. The wireless communication circuit 530 may feed power to a point of the first slit structure 421 via a first conductive connection member 611 (e.g., a C-clip) to transmit and/or receive an RF signal of a first frequency band.

According to an embodiment, the electronic device 101 may include a lumped element (not illustrated) electrically connected to the first slit structure 421. The wireless communication circuit 530 may transmit and/or receive an RF signal of a second frequency band based on an electrical path including the first slit structure 421 and the lumped element. For example, the electronic device 101 may implement multiple bands using the lumped element. As another example, the electronic device 101 may implement a specific frequency matching using the lumped element.

According to an embodiment, since the second slit structure 521 overlaps the first slit structure 421 when viewed in a specific direction (e.g., the +z direction), the first slit antenna 551 including the first slit structure 421 may be spaced apart from the second conductive area 520*a* of the second housing 112 by a specific distance or more. Accordingly, the electronic device 101 may reduce an induced current from the first slit structure 421 generated when the wireless communication circuit 530 feeds power to the first slit structure 421. In addition, the electronic device 101 may suppress degradation in radiation efficiency of the first slit antenna 551 including the first slit structure 421. In an embodiment, the specific distance may refer, for example, to a distance having, for example, a length of about ¼ of a wavelength corresponding to a frequency band in which the first slit antenna 551 including the first slit structure 421 transmits and receives.

Figure 7:
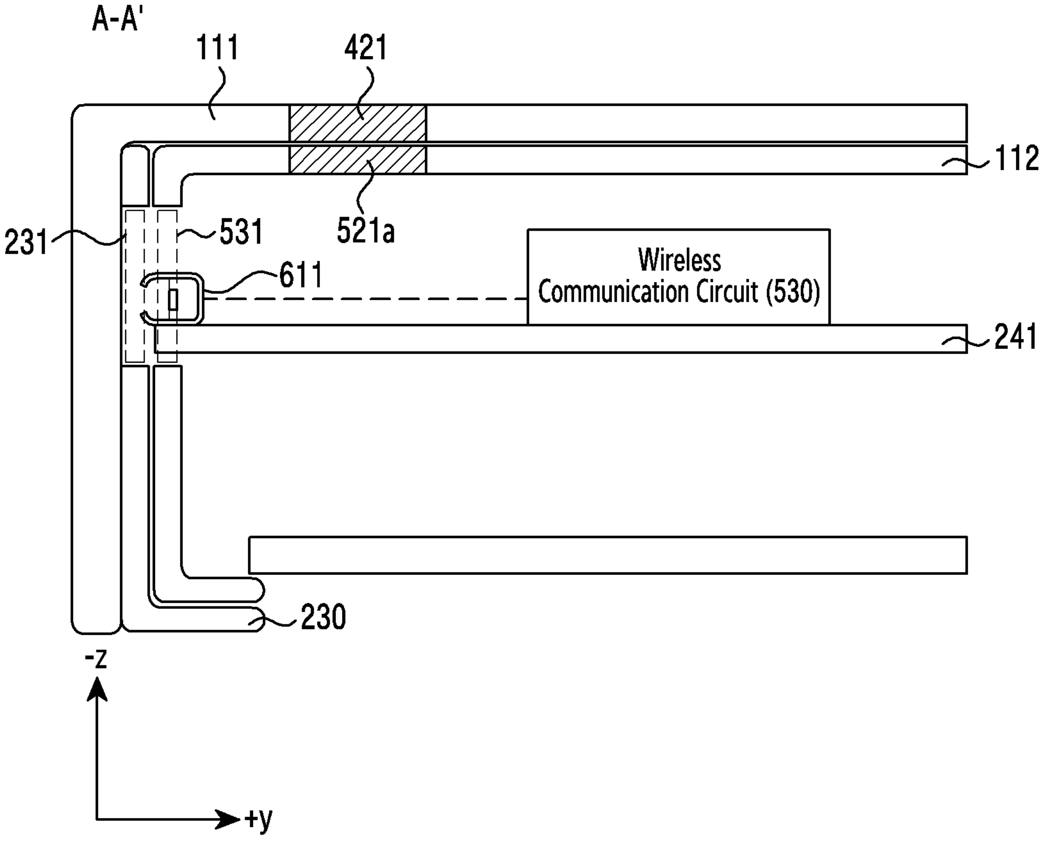
FIG. 7 is a diagram illustrating a cross-section A-A' of an electronic device when viewed in the +x direction according to various embodiments.

FIG. 7 is a diagram illustrating a cross-section A-A' of an electronic device when viewed in the +x direction according to various embodiments.

Referring to FIG. 7, according to an embodiment, when the electronic device 101 is in the first state, at least a portion of the first groove 531 of the second housing 112 may be disposed to overlap with the first opening 231 of the support member 230 when viewed in a specific direction (e.g., the +y direction). The first conductive connection member 611 according to an embodiment may be electrically connected to a point of the first slit structure 421 of the first housing 111 through the first groove 531 of the second housing 112 and the first opening 231 of the support member 230. As another example, when the first opening 231 and the second housing 112 do not overlap when the electronic device 101 is in the first state, in the first state, the first groove 531 may be omitted.

Figure 8:
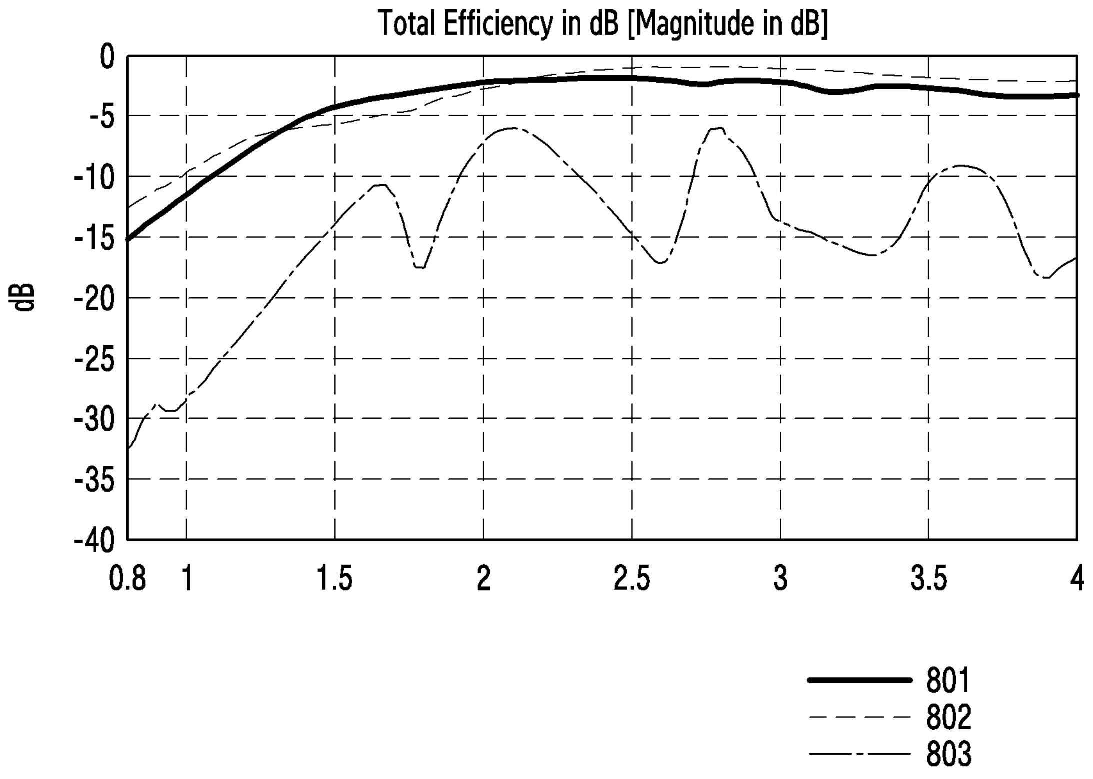
FIG. 8 is a radiation efficiency graph of a first slit antenna including a first slit structure in the case in which a second slit structure is included in the second housing and a radiation efficiency graph a first slit antenna including the first slit structure in the case in which the second slit structure is not included in the second housing according to various embodiments.

FIG. 8 is a radiation efficiency graph of a first slit antenna including a first slit structure in the case in which a second slit structure is included in the second housing according to an embodiment and a radiation efficiency graph a first slit antenna including the first slit structure in the case in which the second slit structure is not included in the second housing according to various embodiments.

Referring to FIG. 8, the first graph 801 is a radiation efficiency graph according to an embodiment of the first slit antenna 551 when the second housing 112 includes the second slit structure 521 and the electronic device 101 is in the first state. In an embodiment, the second graph 802 is a radiation efficiency graph of the first slit antenna 551 when the second housing 112 includes the second slit structure 521 and the electronic device 101 is in the second state. In an embodiment, when comparing the first graph 801 and the second graph 802, when the electronic device 101 is in the first state and when the electronic device 101 is in the second state, the first slit antenna 551 has an antenna radiation efficiency of about −15 to −2 dB in the frequency band of about 0.8 to 4 GHz. Accordingly, it can be seen that when the second housing 112 includes the second slit structure 521, the first slit antenna 551 maintains the antenna performance either when the electronic device 101 is in the first state or when the electronic device 101 is in the second state.

A third graph 803 according to an embodiment is a radiation efficiency graph of the first slit antenna 551 when the second housing 112 does not include the second slit structure 521 and the electronic device 101 is in the first state. In an embodiment, when comparing the first graph 801 and the third graph 803, it can be seen that the third graph 803 shows a relatively low radiation efficiency compared to the first graph 801 in the frequency band of about 0.8 to 4 GHz. When the second housing 112 does not include the second slit structure 521, due to an induced current due to coupling between the first housing 111 and the second housing 112 when the electronic device is in the first state, the radiation efficiency of the first slit antenna 551 is degraded. Accordingly, when the second housing 112 includes the second slit structure 521, it is possible for the first slit antenna 551 to secure the separation distance from the ground of the second housing 112, and when the electronic device 101 is in the first state, it is possible to suppress the degradation of radiation performance of the first slit antenna 551.

Figure 9:
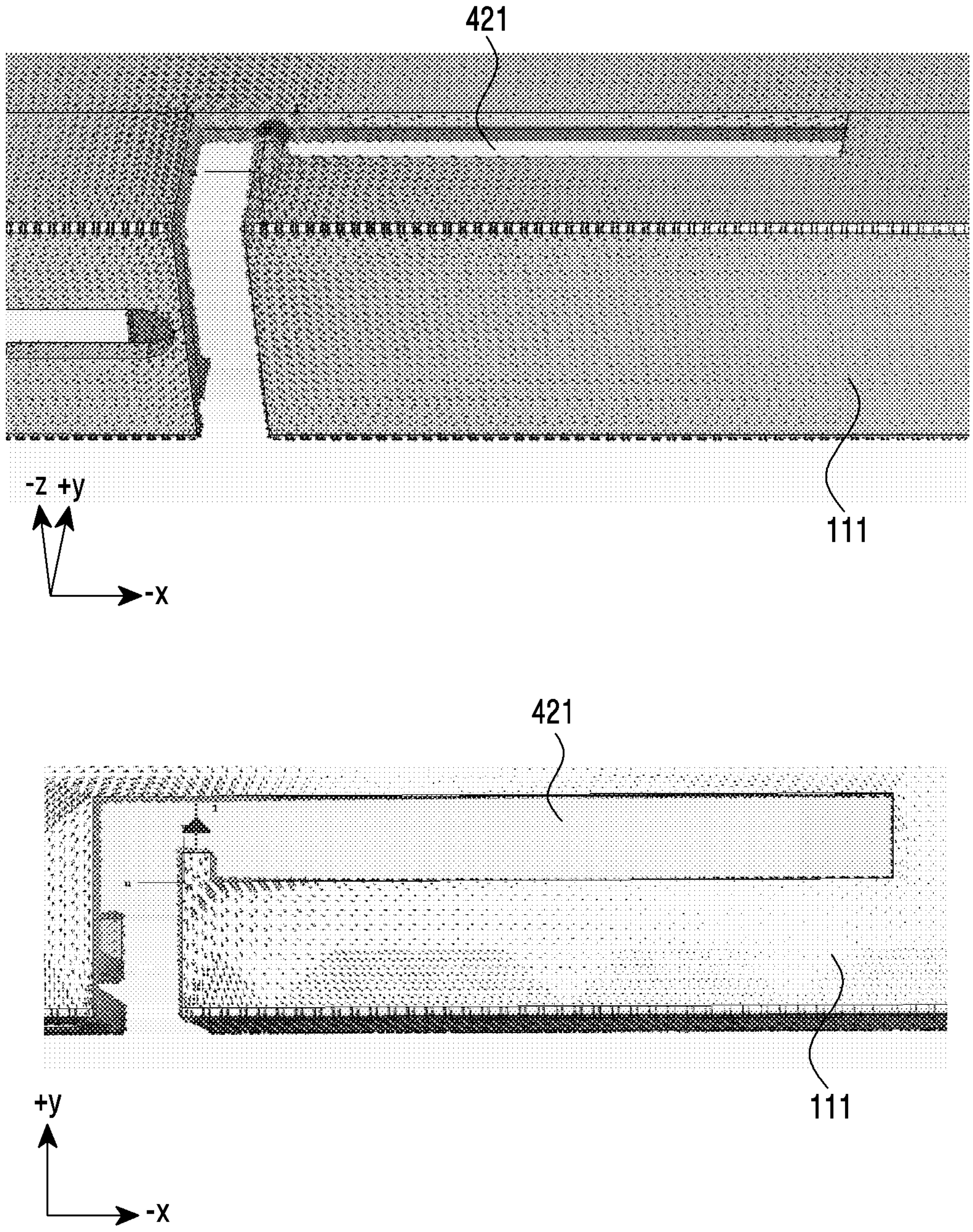
FIG. 9 is a diagram illustrating a current distribution of the first slit structure in the case in which the second slit structure is present in the second housing according to various embodiments.

FIG. 9 is a diagram illustrating a current distribution of the first slit structure in the case in which the second slit structure is present in the second housing according to various embodiments.

Referring to FIG. 9, a current distribution is illustrated when the wireless communication circuit 530 according to an embodiment feeds power to a point of the first slit structure 421. In an embodiment, it can be seen that a current is distributed along the periphery of the first slit structure 421 since no induced current is generated due to coupling with the second housing 112.

Figure 10:
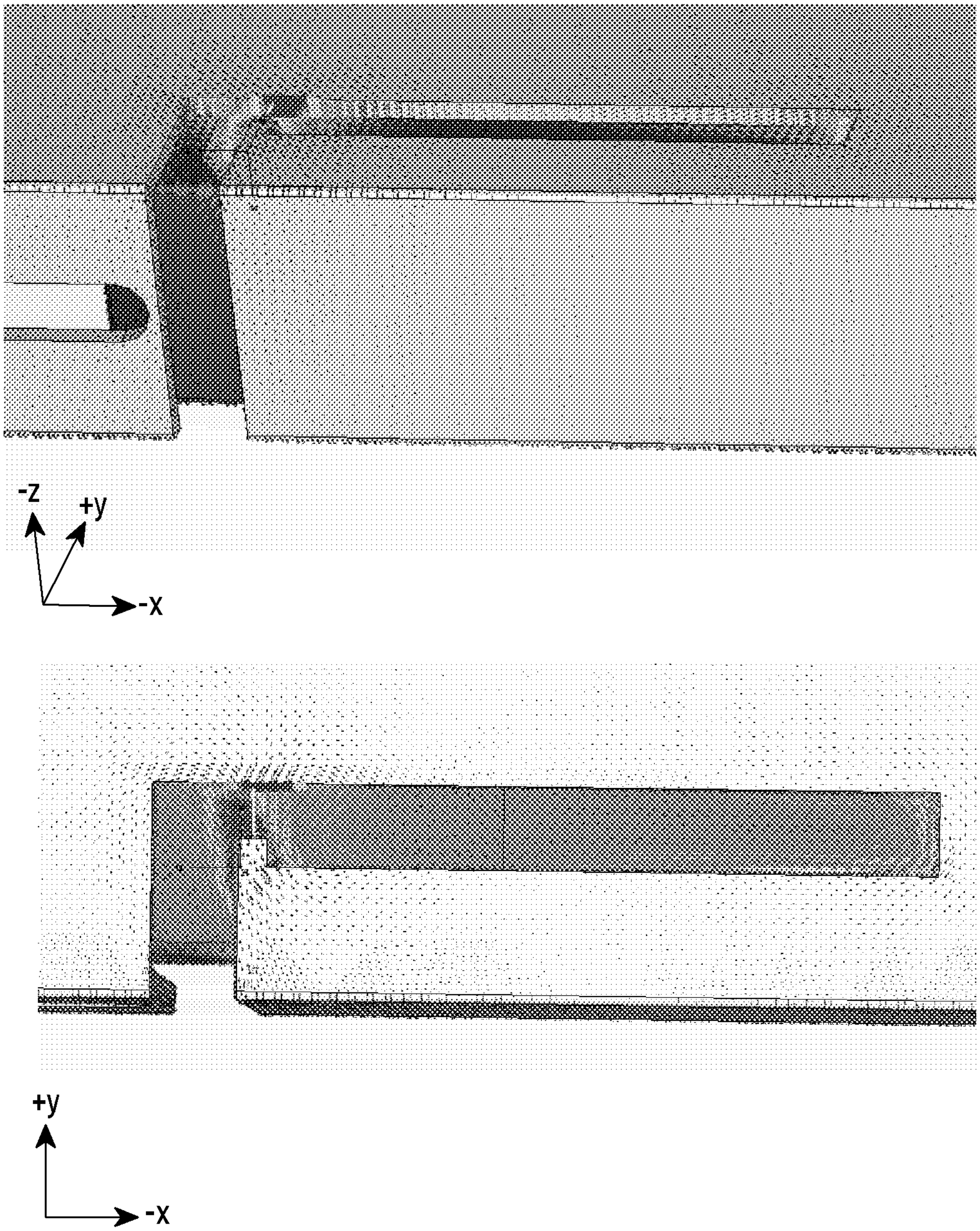
FIG. 10 is a diagram illustrating a current distribution of the first slit structure in the case in which the second slit structure is not present in the second housing according to various embodiments.

FIG. 10 is a diagram illustrating a current distribution of the first slit structure in the case in which the second slit structure is not present in the second housing according to various embodiments.

Referring to FIG. 10, it can be seen that when power is fed to the first slit structure of the first housing, an induced current is generated due to coupling with the second housing, and thus the current distribution is concentrated between the feeding point for the first slit structure of the first housing and the second housing. Accordingly, when the second housing does not include the second slit structure, the radiation performance of the first slit antenna including the first slit structure may be degraded due to the generation of an induced current.

Figure 11:
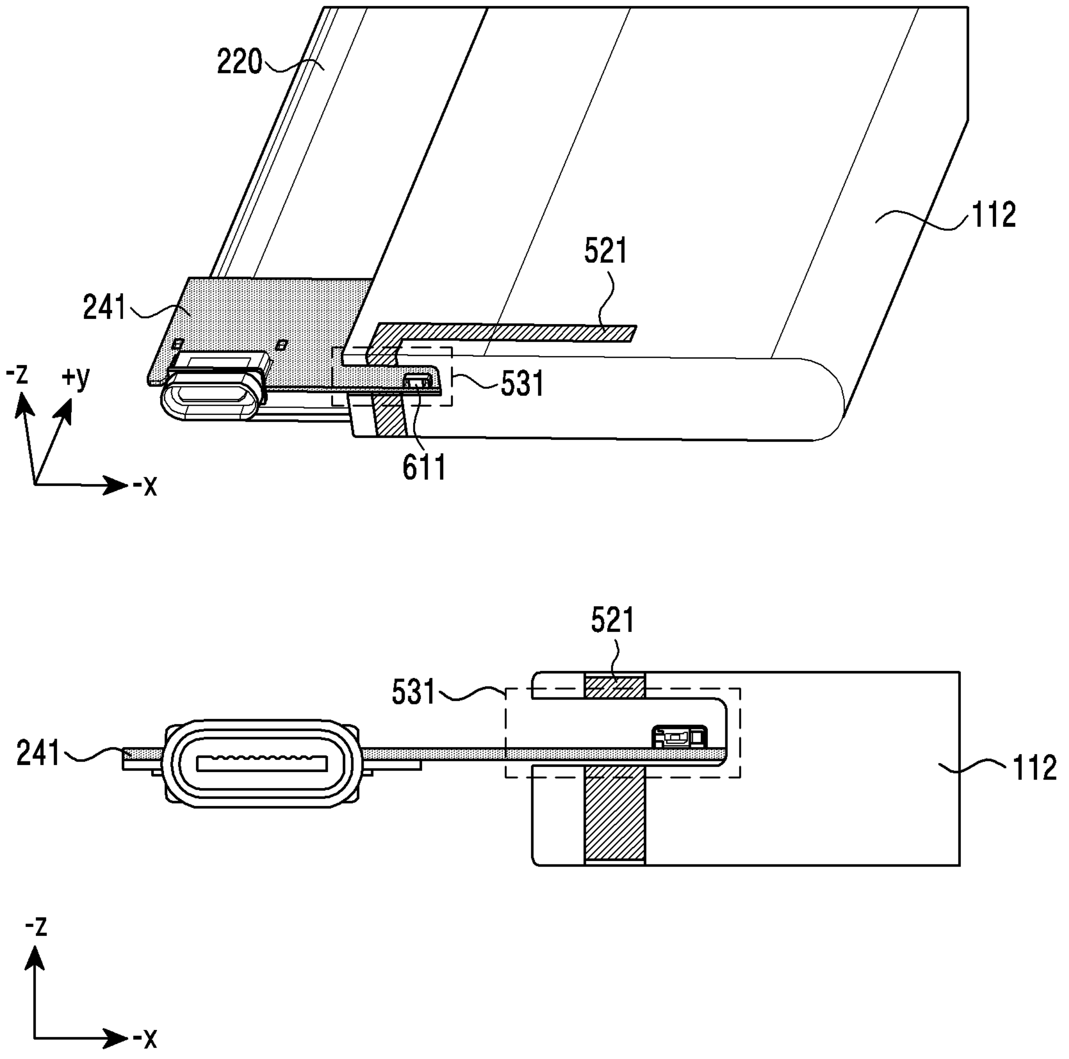
FIG. 11 is a perspective and partial sectional view illustrating a power feeding structure using a first conductive connection member according to various embodiments.

FIG. 11 is a perspective and partial sectional view illustrating a power feeding structure using a first conductive connection member according to various embodiments.

Referring to FIG. 11, the first conductive connection member 611 according to an embodiment may be coupled to a point of the first PCB 241, and may be electrically connected to a point of the first slit structure 421 of the first housing 111 via the first groove 531 of the second housing 112. In an embodiment, the first conductive connection member 611 may include, for example, a C-clip, a metal wire, a flexible printed circuit board (FPCB), or a pogo pin.

Figure 12:
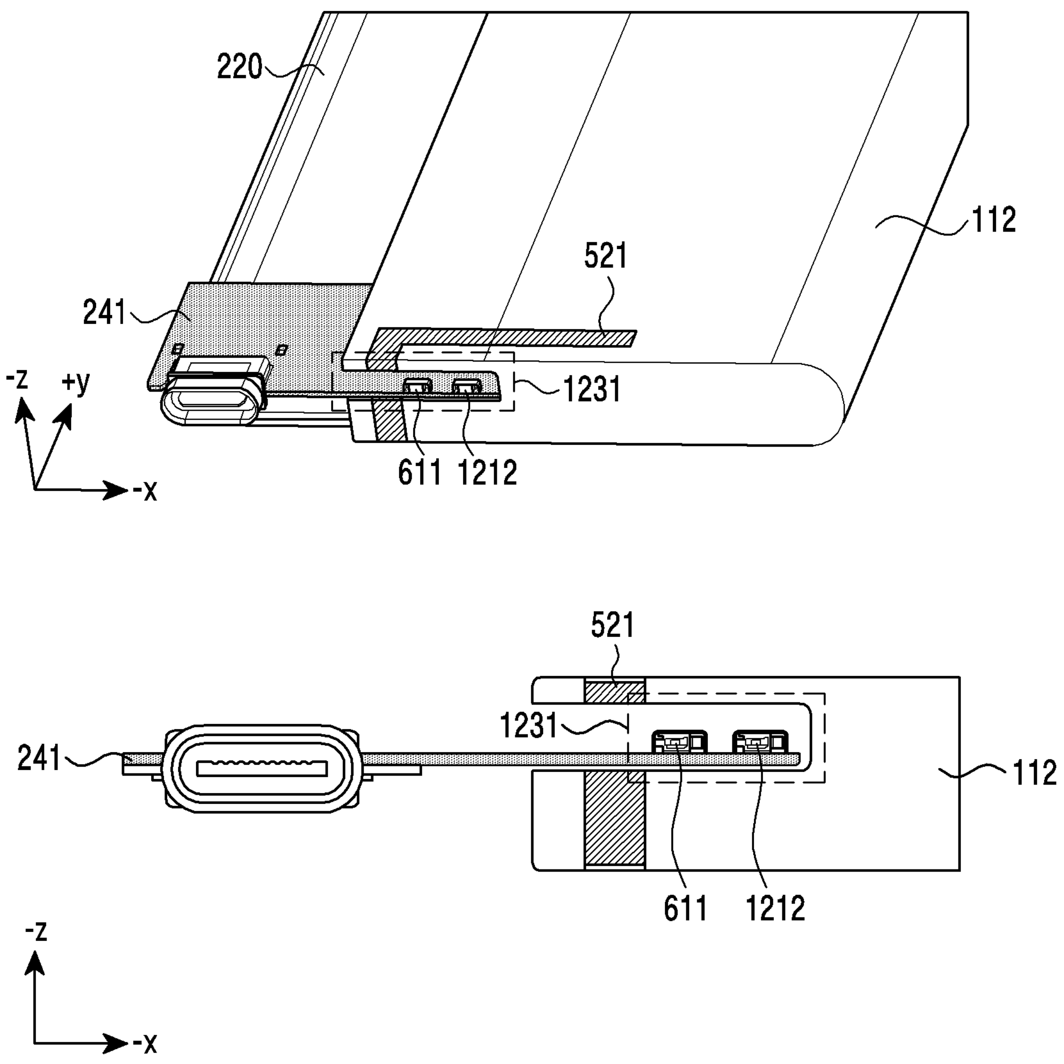
FIG. 12 is a perspective and partial sectional view illustrating a power feeding structure using a first conductive connection member and a second conductive connection member according to various embodiments.

FIG. 12 is a perspective and partial sectional view illustrating a structure of an electronic device including a first conductive connection member and a second conductive connection member according to various embodiments.

Referring to FIG. 12, the electronic device 101 according to an embodiment may include a second conductive connection member 1212, and the second conductive connection member 1212 may be electrically connected to the wireless communication circuit 530.

According to an embodiment, the electronic device 101 may transmit and/or receive an RF signal of a first frequency band by feeing power to a point of the first slit structure 421 of the first housing 111 via a first conductive connection member (e.g., C-clip). In addition, the wireless communication circuit 530 may feed power to a point different from the point on the conductive portion of the second surface 402 of the first housing 111 via the second conductive connection member 1212, and may transmit and/or receive an RF signal in a second frequency band using the first conductive area 420*a* of the second surface 402 of the first housing 111. For example, the electronic device 101 may secure a plurality of power feeding paths for implementing multiple bands of the electronic device 101 via a plurality of conductive connection members.

According to an embodiment, the electronic device 101 may, for example, form a planar inverted-F antenna (PIFA) via the first conductive connection member 611 and the second conductive connection member 1212. For example, the first PCB 241 may include a ground, and the second conductive connection member 1212 may be electrically connected to the ground of the first PCB 241. In an example, the wireless communication circuit 530 may feed power to a point of the first conductive area 420*a* of the second surface 402 of the first housing 111 via the first conductive connection member 611, and may transmit and/or receive an RF signal of a specific frequency band based on an electrical path grounded to a ground of the first PCB 241 via the second conductive connection member 1212.

According to an embodiment, when the electronic device 101 includes a plurality of conductive connection members in the first PCB 241, an additional groove 1231 that is greater than the first groove 531 of the second housing 112 illustrated in FIG. 11 may be included. In an embodiment, the first conductive connection member 611 and/or the second conductive connection member 612 may come into contact with the second surface 402 of the first housing 111 through the additional groove 1231.

Figure 13:
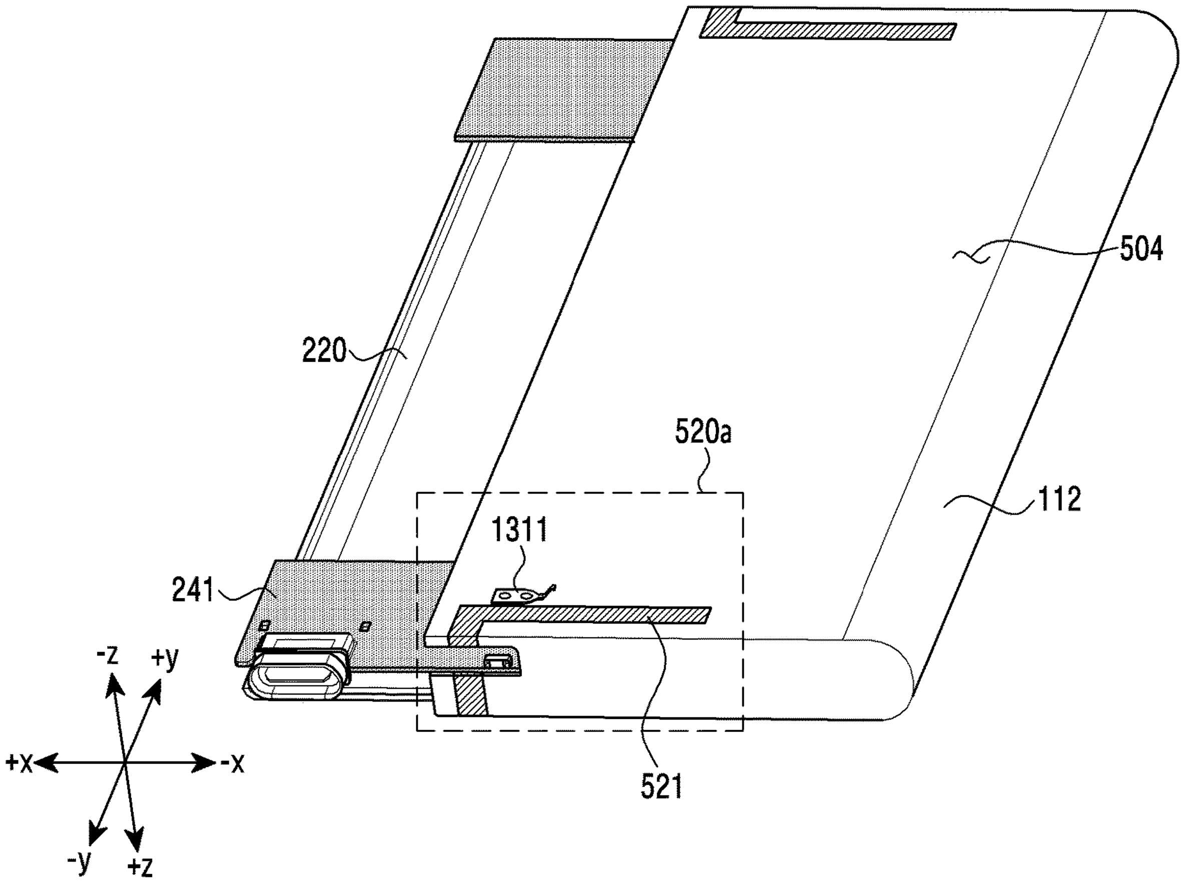
FIG. 13 is a perspective view illustrating a third conductive connection member coupled to a second conductive area of the second housing according to various embodiments.

FIG. 13 is a perspective view illustrating a third conductive connection member coupled to a second conductive area of the second housing according to various embodiments.

Referring to FIG. 13, the second housing 112 according to an embodiment may include a second conductive area 520*a*. An electronic device 101 according to an embodiment may include a third conductive connection member 1311 (e.g., a C-clip), and the third conductive connection member 1311 may be disposed at a point in the second conductive area 520*a* of the fourth surface 504.

According to an embodiment, when the electronic device is in the first state, the third conductive connection member 1311 may be positioned in a specific direction (e.g., the +z direction) of the first conductive area 420*a* of the first housing 111 to be electrically connected to a point in the first conductive area 420*a*. Accordingly, the point of the first conductive area 420*a* may be electrically connected to the second conductive area 520*a* of the second housing 112 via the third conductive connection member 1311.

Figure 14:
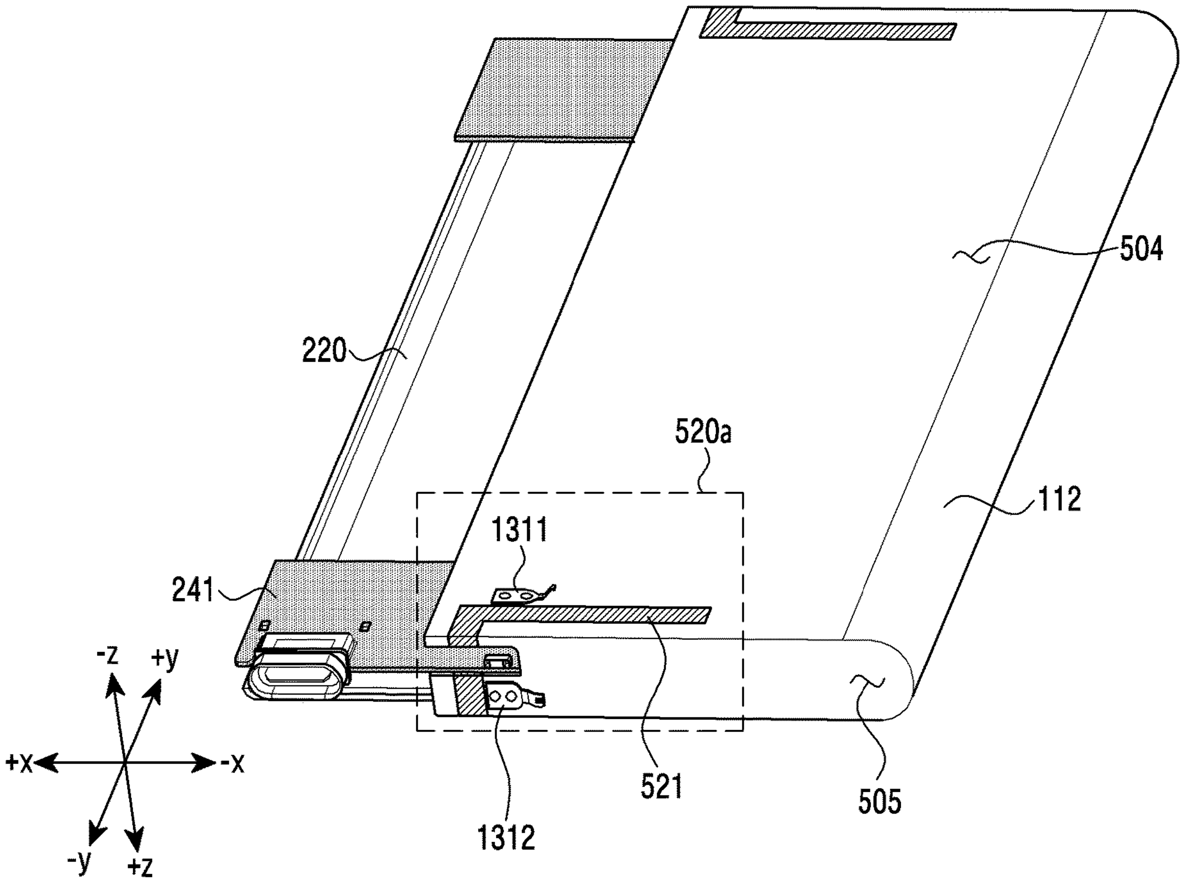
FIG. 14 is a perspective view illustrating a fourth conductive connection member coupled to the second conductive area of the second housing is added according to various embodiments.

FIG. 14 is a perspective view in which a fourth conductive connection member coupled to the second conductive area 520*a* of the second housing is added according to various embodiments.

Referring to FIG. 14, the second housing 112 according to an embodiment may include the second conductive area 520*a*. In an embodiment, an electronic device 101 may include a fourth conductive connection member 1312 (e.g., a C-clip), and the fourth conductive connection member 1312 may be disposed at a point in the second conductive area 520*a* of the fifth surface 505. When the electronic device is in the first state, the fourth conductive connection member 1312 may be positioned in a specific direction (e.g., the +y direction) of the first conductive area 420*a*. However, in the case of the support member 230 of FIG. 3, the electrical connection between the first slit structure 421 of the first housing 111 and the fourth conductive connection member 1312 may be blocked. Thus, in an embodiment, a portion of the support member 230 may be removed or an additional opening may be formed in the support member 230 to correspond to the position of the fourth conductive connection member 1312. Accordingly, when an additional opening is formed in the support member 230 to correspond to the position of the fourth conductive connection member 1312, the fourth conductive connection member 1312 may be positioned in a specific direction (e.g., the +y direction) of the first conductive area 420*a* to be electrically connected to a point of the first conductive area 420*a*. Accordingly, via the fourth conductive connection member 1312, the electronic device 101 may electrically connect the first conductive area 420*a* and the second conductive area 520*a* of the second housing 112 to each other.

Figure 15:
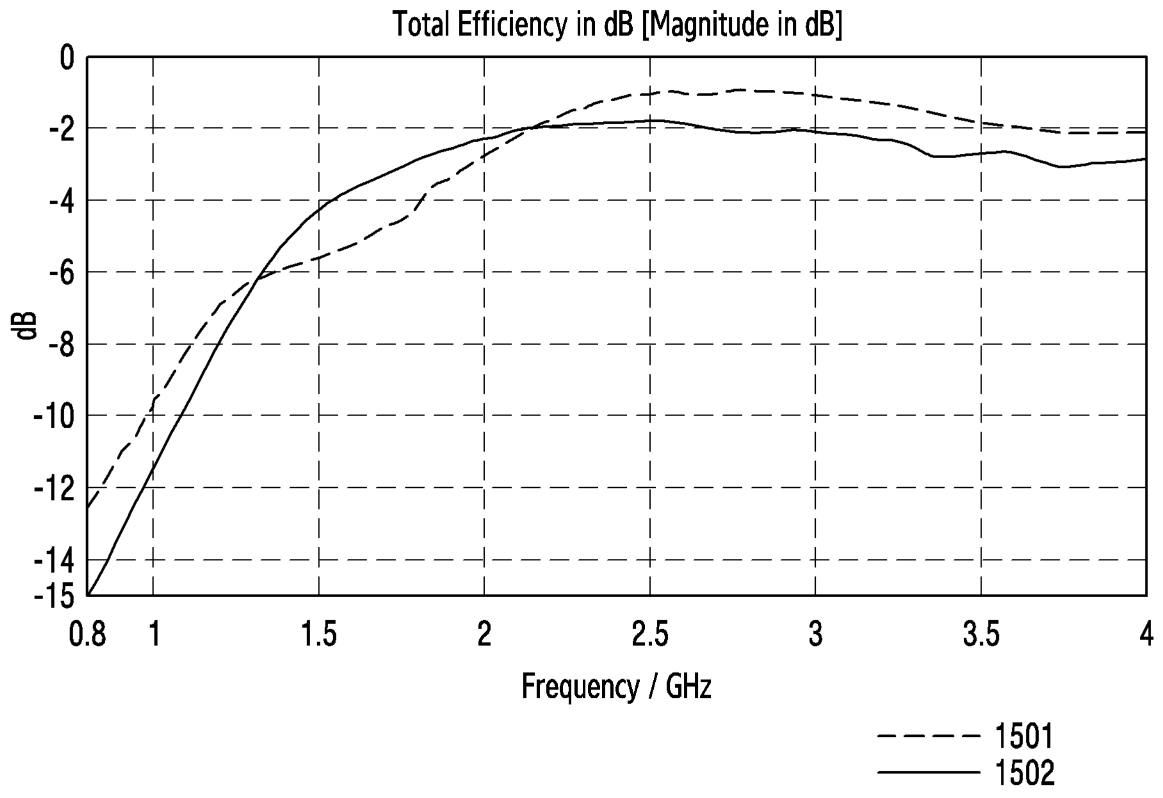
FIG. 15 is an antenna radiation efficiency graph in a case in which the first conductive area is electrically connected to the second conductive area of the second housing via the third conductive connection member, and an antenna radiation efficiency graph in a case in which the first conductive area is not connected to the second conductive area according to various embodiments.

FIG. 15 is an antenna radiation efficiency graph in a case in which the first conductive area is electrically connected to the second conductive area of the second housing via the third conductive connection member, and an antenna radiation efficiency graph in a case in which the first conductive area is not connected to the second conductive area according to an embodiment.

Referring to FIG. 15, the first graph 1501 according to an embodiment may be referred to as a radiation efficiency graph of the first slit antenna 551 when the first conductive area 420*a* and the second conductive area 520*a* are electrically connected to each other via the third conductive connection member 1311. In an embodiment, the second graph 1502 may be referred to as a radiation efficiency graph of the first slit antenna 551 when the third conductive connection member 1311 is not used.

Comparing the first graph 1501 and the second graph 1502 according to an embodiment, the first graph 1501 has a higher antenna efficiency value that that of the second graph 1502 in the frequency band of about 0.8 to 1.3 GHz and the frequency band of about 2.2 to 4 GHz.

In an embodiment, the first conductive area 420*a* and the second conductive area 520*a* of the second housing 112 may be electrically connected to each other using the third conductive connection member 1311. In this case, the electronic device 101 may further secure a ground electrically connected to the first slit antenna 551. Through the increase of grounds, it is possible to prevent or reduce the degradation of antenna radiation performance in the electronic device 10 due to an induced current. Accordingly, the radiation efficiency of the first slit antenna 551 can be improved in specific frequency bands (e.g., 0.8 to 1.3 GHz and 2.2 to 4 GHz).

Figure 16:
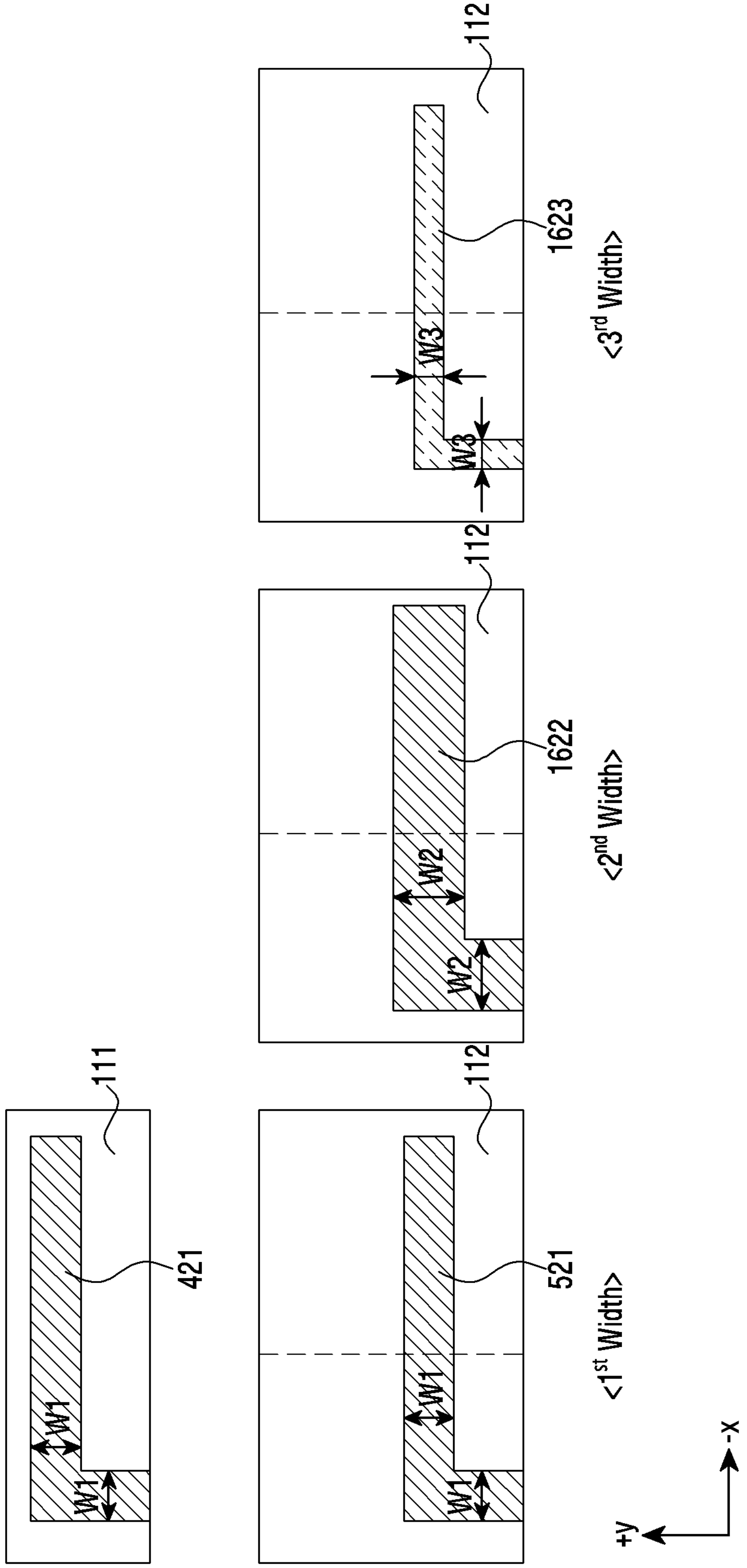
FIG. 16 is a diagram illustrating a second slit structure of a second housing having various widths according to various embodiments.

FIG. 16 is a diagram illustrating a second slit structure of a second housing having various widths according to various embodiments.

Referring to FIG. 16, the first slit structure 421 of the first housing 111 according to an embodiment may have a first width W1. In an embodiment, the second slit structure of the second housing 112 may have various widths to correspond to the first slit structure 421. For example, the second slit structure 521 of the second housing 112 may have a first width W1 that is substantially the same as that of the first slit structure 421. As another example, the second slit structure 1622 of the second housing 112 may have a second width W2 greater than the first width W1. As another example, the second slit structure 1623 of the second housing 112 may have a third width W3 smaller than the first width W1.

Figure 17:
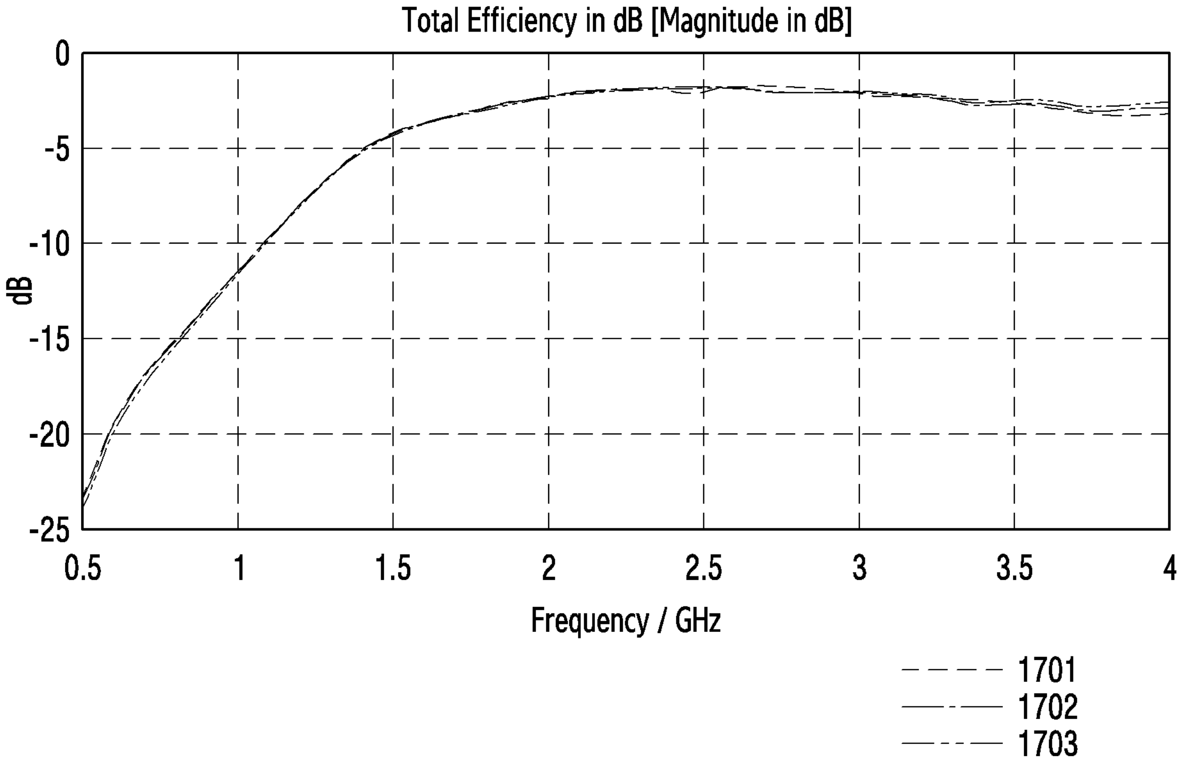
FIG. 17 is a radiation efficiency graph of the first slit antenna including the first slit structure in respective cases in which the second slit structure has various widths of FIG. 16 according to various embodiments.

FIG. 17 is a radiation efficiency graph of the first slit antenna including the first slit structure in respective cases in which the second slit structure have various widths of FIG. 16, according to various embodiments.

Referring to FIG. 17, the first graph 1701 according to an embodiment is a radiation efficiency graph of the first slit antenna 551 when the second slit structure has the first width W1. The second graph 1702 is a radiation efficiency graph of the first slit antenna 551 when the second slit structure has the second width W2. The third graph 1703 is a radiation efficiency graph of the first slit antenna 551 when the second slit structure has the third width W3. Comparing the first graph 1701, the second graph 1702, and the third graph 1703 according to an embodiment, the first graph 1701, the second graph 1702, and the third graph 1703 have substantially the same antenna radiation efficiency value in the frequency band of about 0.5 to 4 GHz. Accordingly, even when the width of the second slit structure 521 of the second housing 112 is changed, in the electronic device 101, it is possible to secure substantially the same radiation performance of the first slit antenna 551.

Figure 18:
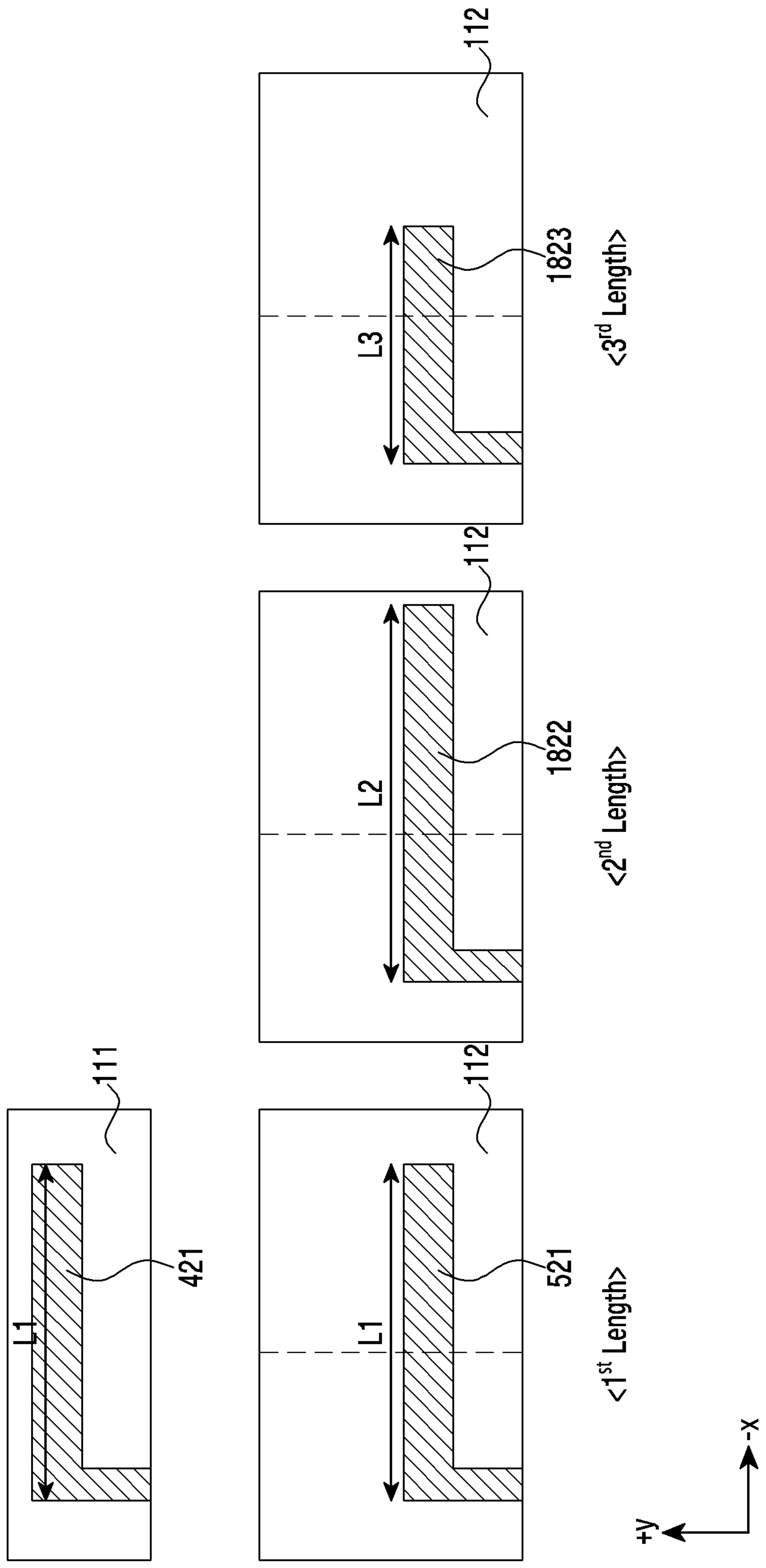
FIG. 18 is a diagram illustrating a second slit structure of a second housing having various slit lengths according to various embodiments.

FIG. 18 is a diagram illustrating a second slit structure of a second housing having various slit lengths according to various embodiments.

Referring to FIG. 18, the first slit structure 421 of the first housing 111 according to an embodiment may have a first length L1. In an embodiment, the second slit structure of the second housing 112 may have various slit lengths to correspond to the first slit structure 421. For example, the second slit structure 521 of the second housing 112 may have a first length L1 that is substantially the same as that of the first slit structure 421. As another example, the second slit structure 1822 of the second housing 112 may have a second length L2 greater than the first length L1. As another example, the second slit structure 1823 of the second housing 112 may have a third length L3 less than the first length L1.

Figure 19:
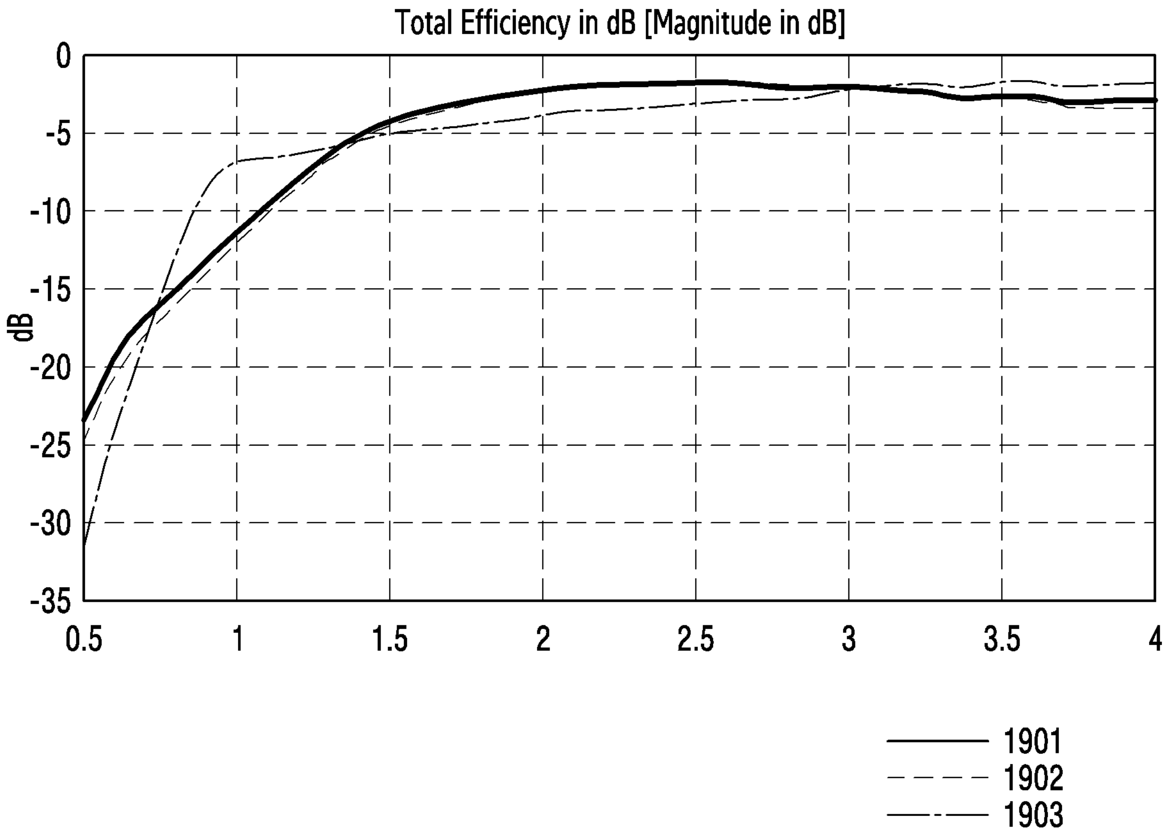
FIG. 19 is a radiation efficiency graph of the first slit antenna including the first slit structure in respective cases in which the second slit structure has various slit lengths of FIG. 18 according to various embodiments.

FIG. 19 is a radiation efficiency graph of the first slit antenna including the first slit structure in respective cases in which the second slit structure has various slit lengths of FIG. 18, according to various embodiments.

Referring to FIG. 19, the first graph 1901 according to an embodiment is a radiation efficiency graph of the first slit antenna 551 when the second slit structure has the first length L1. The second graph 1902 is a radiation efficiency graph of the first slit antenna 551 when the second slit structure has the second length L2. The third graph 1903 is a radiation efficiency graph of the first slit antenna 551 when the second slit structure has the third length L3.

Comparing the first graph 1901 and the second graph 1902 according to an embodiment, the first graph 1701 and the second graph 1702 have substantially the same antenna radiation efficiency value in the frequency band of about 0.5 to 4 GHz. Accordingly, even when the slit length of the second slit structure 521 of the second housing 112 is increased, in the electronic device 101, it is possible to secure substantially the same radiation performance of the first slit antenna 551.

Comparing the third graph 1903 with the first graph 1901 and the second graph 1902 according to an embodiment, the third graph 1903 has a relatively high antenna radiation efficiency value compared to the first graph 1901 and the second graph 1902 in the frequency band of about 0.7 to 1.4 GHz. Therefore, in the case in which the slit length of the second slit structure 521 of the second housing 112 is reduced, the wireless communication circuit 530 may transmit and/or receive an RF signal of a relatively low frequency band via the first slit antenna 551 compared to that in the case in which the slit length of the second slit structure 521 is not reduced. In the electronic device 101, the resonance frequency of the antenna may be changed by changing the slit length of the second slit structure 521.

Figure 20:
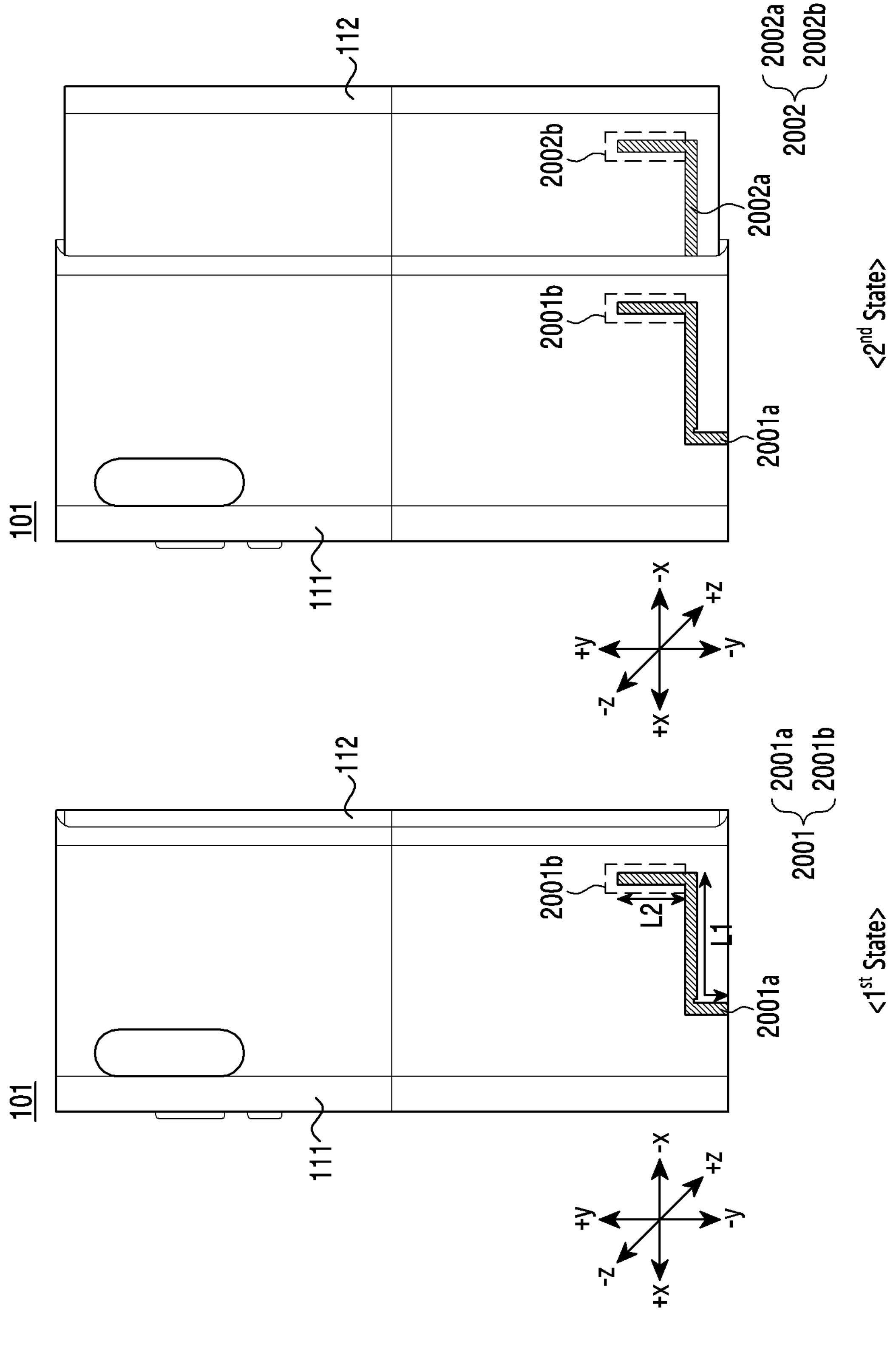
FIG. 20 is a diagram illustrating a first slit structure according to various embodiments.

FIG. 20 is a diagram illustrating a first slit structure according to an embodiment.

Referring to FIG. 20, the first housing 111 according to an embodiment may include a first slit structure 2001. In an embodiment, the first slit structure 2001 may include a first portion 2001*a* and a second portion 2001*b*, and the first portion 2001*a* of the first slit structure 2001 may correspond to the first slit structure 421 illustrated in FIG. 3. In an embodiment, the first portion 2001*a* of the first slit structure 2001 may have a first length L1 (e.g., 34 mm). In an embodiment, the second portion 2001*b* of the first slit structure 2001 may correspond to a portion extending from one end of the first portion 2001*a* and having a specific length L2 (e.g., 16 mm) in a specific direction (e.g., the +y direction). In an embodiment, the second portion 2001*b* of the first slit structure 2001 may be provided in a conductive area of the first housing 111.

In an embodiment, the length and/or shape of the second portion of the first slit structure 2001 may vary depending on the frequency band in which the slit antenna including the first slit structure 2001 is desired to operate.

The second housing 112 according to an embodiment may include a second slit structure 2002. In an embodiment, the second slit structure 2002 may include a third portion 2002*a* and/or a fourth portion 2002*b*, and the third portion 2002*a* of the second slit structure 2002 may correspond to the second slit structure 521 illustrated in FIG. 3. In an embodiment, the fourth portion 2002*b* of the second slit structure 2002 may correspond to a portion extending from one end of the third portion 2002*a* and having a specific length in a specific direction (e.g., the +y direction).

In an embodiment, the length and/or shape of the fourth portion of the second slit structure 2002 may vary depending on the frequency band in which the slit antenna including the second slit structure 2002 is desired to operate.

Figure 21:
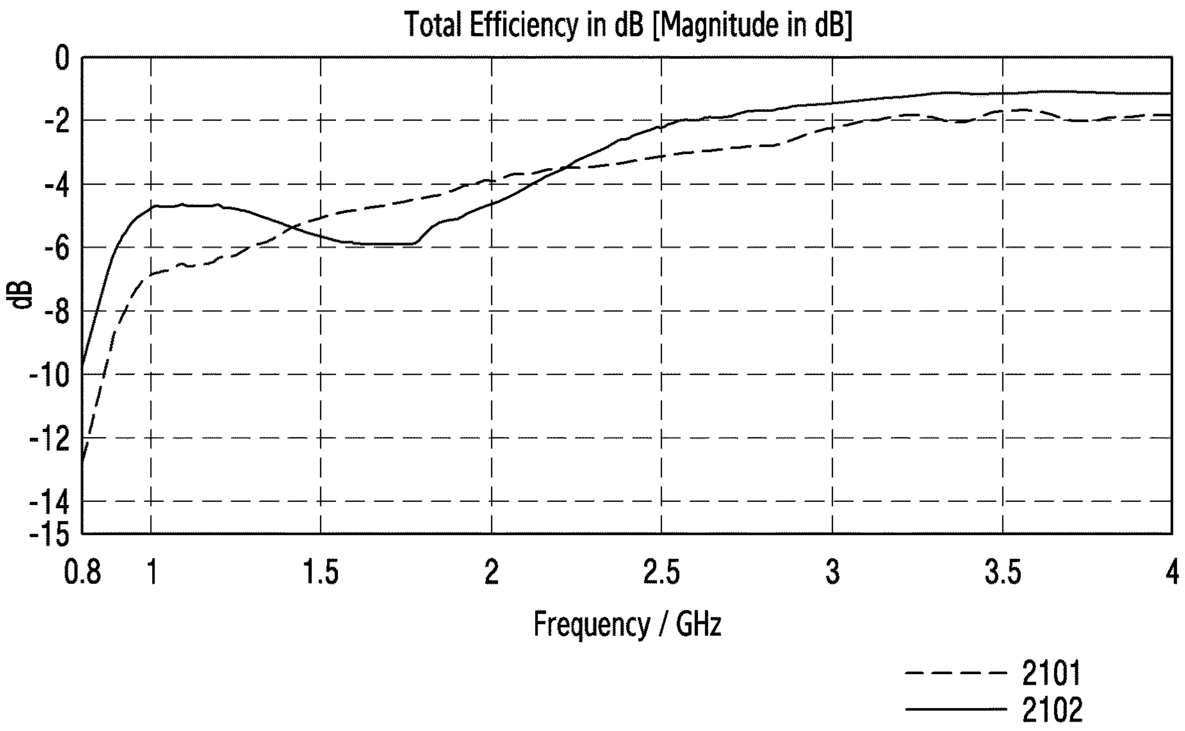
FIG. 21 is an antenna radiation efficiency graph of FIG. 20 according to various embodiments.

FIG. 21 is an antenna radiation efficiency graph of the example illustrated in FIG. 20 according to various embodiments.

Referring to FIG. 21, the first graph 2101 according to an embodiment is a radiation efficiency graph of a slit antenna including a first slit structure 2001 when the electronic device 101 is in the first state. The second graph 2102 is a radiation efficiency graph of a slit antenna including a first slit structure 2001 when the electronic device 101 is in the second state.

According to an embodiment, comparing the first graph 2101 and the second graph 2102, the antenna radiation efficiency values of the first graph 2101 and the second graph 2102 have a different within about 2 dB in the frequency band of about 0.8 to 4 GHz. Therefore, it can be seen that, even in the second state in which at least a portion of the second housing 112 is slid into the first housing 111, the radiation efficiency of the slit antenna including the first slit structure 2001 is maintained as in the first state.

According to an embodiment, the first graph 2101 has an antenna radiation efficiency of about −6 to −5 dB in the frequency band of about 0.9 to 1.5 GHz. In an embodiment, the wireless communication circuit 530 may transmit and/or receive an RF signal in the frequency band of about 0.9 to 1.5 GHz based on the electrical path including the second portion 2001*b* of the first slit structure 2001.

Figure 22:
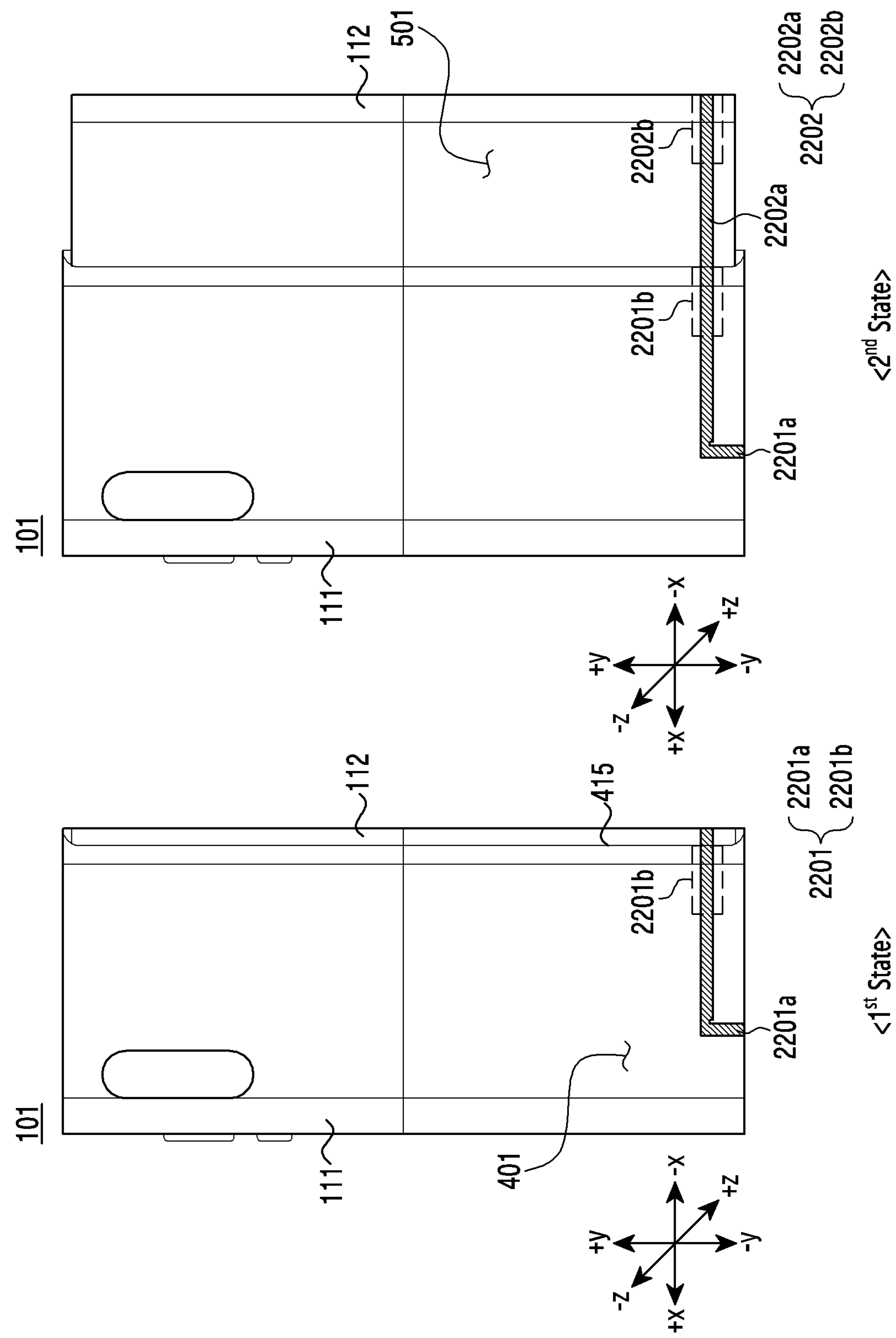
FIG. 22 is a diagram illustrating a first slit structure according to various embodiments.

FIG. 22 is a diagram illustrating a first slit structure according to various embodiments.

Referring to FIG. 22, the first housing 111 according to an embodiment may include a first slit structure 2201. In an embodiment, the first slit structure 2201 may include a first portion 2201*a* and a second portion 2201*b*, and the first portion 2201*a* of the first slit structure 2201 may correspond to the first slit structure 421 illustrated in FIG. 3. In an embodiment, the second portion 2201*b* of the first slit structure 2201 may correspond to a portion extending from one end of the first portion 2001*a* and having a specific length in a specific direction (e.g., the −x direction). In an embodiment, the second portion 2201*b* of the first slit structure 2201 may be provided in a conductive area of the first housing 111.

In an embodiment, the length and/or shape of the second portion of the first slit structure 2201 may vary depending on the frequency band in which the slit antenna including the first slit structure 2201 is desired to operate.

The second housing 112 according to an embodiment may include a second slit structure 2202. In an embodiment, the second slit structure 2202 may include a third portion 2202*a* and/or a fourth portion 2202*b*, and the third portion 2202*a* of the second slit structure 2202 may correspond to the second slit structure 521 illustrated in FIG. 3. In an embodiment, the fourth portion 2202*b* of the second slit structure 2202 may correspond to a portion extending from one end of the third portion 2202*a* and having a specific length in a specific direction (e.g., the −x direction).

In an embodiment, the length and/or shape of the fourth portion 2202*b* of the second slit structure 2202 may vary depending on the frequency band in which the slit antenna including the first slit structure 2201 is desired to operate.

Figure 23:
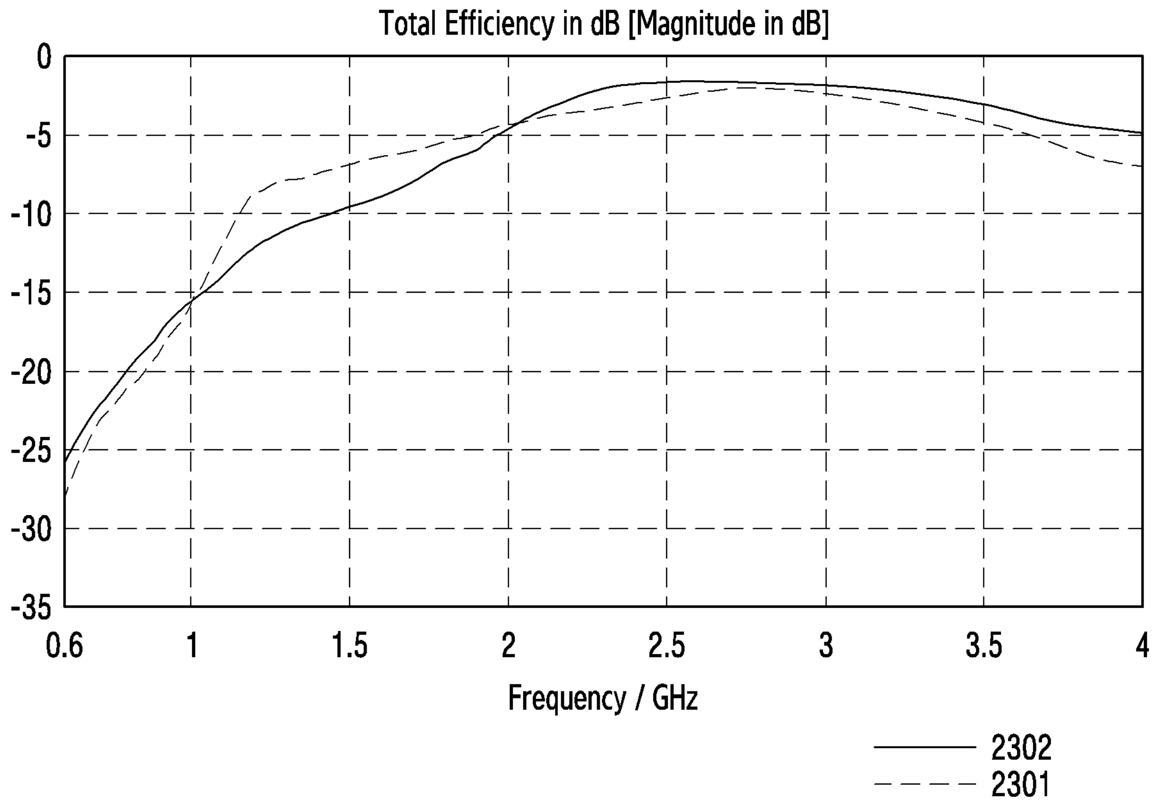
FIG. 23 is an antenna radiation efficiency graph of FIG. 22 according to various embodiments.

FIG. 23 is an antenna radiation efficiency graph of the example illustrated in FIG. 22 according to various embodiments.

Referring to FIG. 23, the first graph 2301 according to an embodiment is a radiation efficiency graph of a slit antenna including a first slit structure 2201 when the electronic device is in the first state. The second graph 2302 is a radiation efficiency graph of a slit antenna including a first slit structure 2201 when the electronic device is in the second state.

According to an embodiment, comparing the first graph 2301 and the second graph 2302, the antenna radiation efficiency values of the first graph 2301 and the second graph 2302 have a different within about 1 dB in the frequency band of about 0.8 to 4 GHz. Therefore, it can be seen that, even in the second state in which at least a portion of the second housing 112 is slid into the first housing 111, the radiation efficiency of the slit antenna including the first slit structure 2201 is maintained as in the first state.

An electronic device according to an example embodiment may include: a first housing, a second housing slidably connected to the first housing, a printed circuit board (PCB) disposed in the electronic device, and a wireless communication circuit disposed on the PCB, wherein the first housing may include a first surface and a second surface perpendicular to the first surface at a first edge, and the first housing may include a first conductive area, the first conductive area may include a first portion of a first slit extending from a point on the first surface to the first edge, wherein the second housing may include a third surface including a second conductive area, and the second conductive area may include a second slit extending to an edge of the second housing corresponding to the first edge of the first housing, wherein, in a first state in which the first housing is slid in a first direction to be adjacent to the first housing, at least a portion of the first portion of the first slit may overlap the second slit when viewed in a second direction perpendicular to the first surface of the first housing, and the wireless communication circuit may be configured to transmit and/or receive a signal of a first frequency band based on an electrical path including the first portion of the first slit.

According to an example embodiment, the first portion of the first slit may further extend from the first edge of the first housing in the second direction along the second surface of the first housing.

The electronic device according to an example embodiment may further include a conductive connection member comprising a conductor coupled to a point of the PCB, wherein the conductive connection member may be configured come into contact with the first portion of the first slit provided on the second surface of the first housing, and the wireless communication circuit may be electrically connected to the conductive connection member, and may be configured to feed power to the point of the first portion of the first slit structure via the conductive connection member.

According to an example embodiment, the second housing may include a fourth surface perpendicular to a third surface of the second housing, and the fourth surface of the second housing may include a groove extending in a direction opposite to the first direction from one end thereof. In the first state, the fourth surface of the second housing may overlap the second surface when viewed in a third direction perpendicular to the second surface of the first housing, and the conductive connection member may be configured to pass through the groove of the fourth surface to come into contact with the first portion of the first slit provided on the second surface.

According to an example embodiment, in a second state in which the second housing is slid in a direction opposite to the first direction, the wireless communication 5 circuit may be configured to transmit and/or receive a signal of the first frequency band based on an electrical path including the first portion of the first slit.

According to an example embodiment, the first frequency band may include a range of 2 to 3.5 GHz.

According to an example embodiment, the first portion of the first slit may be L-shaped.

According to an example embodiment, the first portion of the first slit structure may extend from the point on the first surface of the first housing by a specific length in the first direction and extend to the first edge of the first housing, and the second portion of the first slit may extend from one end of the first portion of the first slit in a third direction perpendicular to the second surface of the first housing along the first surface of the first housing.

According to an example embodiment, the wireless communication circuit may be configured to transmit and/or receive a signal of a second frequency band based on an electrical path including the second portion of the first slit.

According to an example embodiment, the second frequency band may include a range of 0.8 to 1.5 GHz.

The electronic device according to an example embodiment may further include a flexible display, wherein the flexible display may include a first portion and a second portion extending from the first portion thereof, and wherein the second portion of the flexible display may be configured to be slid into the first housing in the first state and slid out of the first housing in a second state in which the second housing is slid in the direction opposite to the first direction.

According to an example embodiment, at least a portion of the second conductive area may include a ground.

The electronic device according to an example embodiment may further include a conductive connection member comprising a conductor, wherein the conductive connection member may be coupled to a point of a ground of the second conductive area, and in the first state, the conductive connection member may be positioned in the second direction of the first portion to be electrically connected to the first portion of the first slit.

According to an example embodiment, in the first state, at least a portion of the second housing may be configured to be slid into the first housing.

The electronic device according to an example embodiment may further include a lumped element electrically connected to the first portion of the first slit, wherein the wireless communication circuit may be configured to transmit and/or receive a signal of the second frequency band based on an electrical path including the first portion of the first slit and the lumped element.

An electronic device according to an example embodiment may include: a first metal housing, a second metal housing slidably connected to the first metal housing, and a wireless communication circuit disposed in the electronic device, wherein the first metal housing may include a first surface and a second surface perpendicular to the first surface at a first edge, and the first surface may include a first slit extending to the first edge from a point on the first surface, wherein the second metal housing may include a third surface including a second slit extending to an edge of the second metal housing corresponding to the first edge of the first metal housing, wherein in a first state in which the second metal housing is slid in a direction approaching the first metal housing, at least a portion of the first slit may overlap the second slit when viewed in a first direction perpendicular to the first surface of the first metal housing, and the wireless communication circuit may be configured to transmit and/or receive a signal of a first frequency band based on an electrical path including the first slit structure.

According to an example embodiment, the first slit may further extend from the first edge of the first metal housing in the first direction along the second surface of the first metal housing.

According to an example embodiment, the first slit may be L-shaped.

The electronic device according to an example embodiment may further include a flexible display, wherein the flexible display may include a first portion and a second portion extending from the first portion thereof, wherein the second portion of the flexible display may be configured to be slid into the first metal housing in the first state, and slid out of the first metal housing in a second state in which the second metal housing is slid away from the first metal housing.

According to an example embodiment, in the first state, at least a portion of the second metal housing may be configured to be slid into the first metal housing.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a first housing including a first surface and a second surface perpendicular to the first surface at a first edge, and a first conductive area, the first conductive area including a first portion of a first slit extending from a point on the first surface to the first edge;

a second housing slidably connected to the first housing and including a third surface including a second conductive area, the second conductive area including a second slit extending to an edge of the second housing corresponding to the first edge of the first housing;

a printed circuit board (PCB) disposed in the electronic device; and a wireless communication circuit disposed on the PCB, wherein, in a first state in which the second housing is slid in a first direction to be adjacent to the first housing, at least a portion of the first portion of the first slit overlaps the second slit when viewed in a second direction perpendicular to the first surface of the first housing, and wherein the wireless communication circuit is configured to transmit and/or receive a signal of a first frequency band based on an electrical path including the first portion of the first slit.

2. The electronic device of claim 1, wherein the first portion of the first slit further extends from the first edge of the first housing in the second direction along the second surface of the first housing.

3. The electronic device of claim 2, further comprising:

a conductive connection member comprising a conductor coupled to a point of the PCB, wherein the conductive connection member is configured to come into contact with the first portion of the first slit provided on the second surface of the first housing, and wherein the wireless communication circuit is electrically connected to the conductive connection member, and is configured to feed power to a point of the first portion of the first slit via the conductive connection member.

4. The electronic device of claim 3, wherein the second housing includes a fourth surface perpendicular to a third surface of the second housing, and wherein the fourth surface of the second housing includes a groove extending in a direction opposite to the first direction from one end, and wherein, in the first state, the fourth surface of the second housing overlaps the second surface when viewed in a third direction perpendicular to the second surface of the first housing, and the conductive connection member passes through the groove of the fourth surface to come into contact with the first portion of the first slit formed on the second surface.

5. The electronic device of claim 1, wherein, in a second state in which the second housing is slid in a direction opposite to the first direction, the wireless communication circuit is configured to transmit and/or receive a signal of the first frequency band based on an electrical path including the first portion of the first slit.

6. The electronic device of claim 1, wherein the first frequency band is in a range of 2 to 3.5 GHz.

7. The electronic device of claim 1, wherein the first portion of the first slit is L-shaped.

8. The electronic device of claim 1, wherein the first portion of the first slit extends from the point on the first surface of the first housing by a specific length in the first direction and extends to the first edge of the first housing, and wherein the second portion of the first slit extends from one end of the first portion of the first slit in a third direction perpendicular to the second surface of the first housing along the first surface of the first housing.

9. The electronic device of claim 8, wherein the wireless communication circuit is configured to transmit and/or receive a signal of a second frequency band based on an electrical path including the second portion of the first slit.

10. The electronic device of claim 9, wherein the second frequency band is in a range of 0.8 to 1.5 GHz.

11. The electronic device of claim 1, further comprising:

a flexible display, wherein the flexible display includes a first portion and a second portion extending from the first portion, and wherein the second portion of the flexible display is configured to be slid into the first housing in the first state and slid out of the first housing in a second state in which the second housing is slid in the direction opposite to the first direction.

12. The electronic device of claim 1, wherein at least a portion of the second conductive area includes a ground.

13. The electronic device of claim 12, further comprising:

a conductive connection member comprising a conductor, wherein the conductive connection member is coupled to a point of a ground of the second conductive area, and wherein the conductive connection member is positioned in the second direction of the first portion of the first slit in the first state to be electrically connected to the first portion of the first slit.

14. The electronic device of claim 1, wherein, in the first state, at least a portion of the second housing is slid into the first housing.

15. The electronic device of claim 1, further comprising:

a lumped element electrically connected to the first portion of the first slit, wherein the wireless communication circuit is configured to transmit and/or receive a signal of the second frequency band based on an electrical path including the first portion of the first slit and the lumped element.

16. An electronic device comprising:

a first metal housing including a first surface and a second surface perpendicular to the first surface at a first edge, the first surface including a first slit extending from a point on the first surface to the first edge;

a second metal housing slidably connected to the first metal housing and including a third surface including a second slit extending to an edge of the second metal housing corresponding to the first edge of the first metal housing; and a wireless communication circuit disposed in the electronic device, wherein, in a first state in which the second metal housing is slid in a direction approaching the first metal housing, at least a portion of the first slit overlaps the second slit when viewed in a first direction perpendicular to the first surface of the first metal housing, and wherein the wireless communication circuit is configured to transmit and/or receive a signal of a first frequency band based on an electrical path including the first slit.

17. The electronic device of claim 16, wherein the first slit further extends from the first edge of the first metal housing in the first direction along the second surface of the first metal housing.

18. The electronic device of claim 16, wherein the first slit is L-shaped.

19. The electronic device of claim 16, further comprising:

a flexible display, wherein the flexible display includes a first portion and a second portion extending from the first portion thereof, and wherein the second portion of the flexible display is configured to be slid into the first metal housing in the first state, and slid out of the first metal housing in a second state in which the second metal housing is slid away from the first metal housing.

20. The electronic device of claim 16, wherein in the first state, at least a portion of the second metal housing is slid into the first metal housing.

* * * * *